United States Patent
Jones et al.

(10) Patent No.: US 10,440,784 B2
(45) Date of Patent: Oct. 8, 2019

(54) REDUCED-DISTORTION HYBRID INDUCTION HEATING/WELDING ASSEMBLY

(71) Applicant: ILLINOIS TOOL WORKS INC., Glenview, IL (US)

(72) Inventors: Jerald Edward Jones, Golden, CO (US); Valerie Lisa Rhoades, Golden, CO (US); Todd Earl Holverson, Appleton, WI (US); Adam Nathan Cuneo, Golden, CO (US); Mark Dietrich Mann, Westminister, CO (US)

(73) Assignee: Illinois Tool Works Inc., Glenview, IL (US)

( * ) Notice: Subject to any disclaimer, the term of this patent is extended or adjusted under 35 U.S.C. 154(b) by 776 days.

(21) Appl. No.: 14/879,716

(22) Filed: Oct. 9, 2015

(65) Prior Publication Data
US 2016/0105933 A1    Apr. 14, 2016

Related U.S. Application Data

(60) Provisional application No. 62/063,678, filed on Oct. 14, 2014, provisional application No. 62/063,688, (Continued)

(51) Int. Cl.
*H05B 11/00*    (2006.01)
*H05B 6/04*    (2006.01)
(Continued)

(52) U.S. Cl.
CPC .............. *H05B 11/00* (2013.01); *B23K 9/02* (2013.01); *B23K 9/0213* (2013.01); *B23K 9/095* (2013.01);
(Continued)

(58) Field of Classification Search
CPC ........ H05B 11/00; B23K 9/095; B23K 9/235; B23K 10/00; B23K 28/02; B23K 31/003;
(Continued)

(56) References Cited

U.S. PATENT DOCUMENTS 2,753,427 A    7/1956    Yenni
3,288,982 A    11/1966    Haruyoshi
(Continued)

FOREIGN PATENT DOCUMENTS

CN    1917970    2/2007
CN    101213318    7/2008
(Continued)

OTHER PUBLICATIONS

Translation of JP2003-19562A, Mitsubishi Heavy Ind. Ltd, Japan, Jan. 21, 2003, Japan Patent Office. (Year: 2003).*
(Continued)

*Primary Examiner* — Quang T Van
(74) *Attorney, Agent, or Firm* — McAndrews, Held & Malloy, Ltd.

(57) ABSTRACT

In certain embodiments, inductive heating is added to a metal working process, such as a welding process, by an induction heating head. The induction heating head may be adapted specifically for this purpose, and may include one or more coils to direct and place the inductive energy, protective structures, and so forth. Productivity of a welding process may be improved by the application of heat from the induction heating head. The heating is in addition to heat from a welding arc, and may facilitate application of welding wire electrode materials into narrow grooves and gaps, as well as make the processes more amenable to the use of certain compositions of welding wire, shielding gasses, flux materials, and so forth. In addition, distortion and stresses
(Continued)

are reduced by the application of the induction heating energy in addition to the welding arc source.

19 Claims, 15 Drawing Sheets

Related U.S. Application Data filed on Oct. 14, 2014, provisional application No. 62/063,698, filed on Oct. 14, 2014.

(51) Int. Cl.
| | |
|---|---|
| *B23K 13/01* | (2006.01) |
| *B23K 28/00* | (2006.01) |
| *B23K 9/095* | (2006.01) |
| *B23K 9/235* | (2006.01) |
| *B23K 10/00* | (2006.01) |
| *B23K 9/173* | (2006.01) |
| *B23K 28/02* | (2014.01) |
| *B23K 31/00* | (2006.01) |
| *B23K 9/02* | (2006.01) |
| *B23K 3/047* | (2006.01) |
| *B23K 9/12* | (2006.01) |
| *B23K 9/16* | (2006.01) |
| *B23K 9/32* | (2006.01) |
| *B23K 37/00* | (2006.01) |
| *B23K 37/02* | (2006.01) |
| *B23K 13/02* | (2006.01) |

(52) U.S. Cl.
CPC ............ *B23K 9/173* (2013.01); *B23K 9/235* (2013.01); *B23K 10/00* (2013.01); *B23K 28/02* (2013.01); *B23K 31/003* (2013.01); *B23K 3/0475* (2013.01); *B23K 9/0953* (2013.01); *B23K 9/126* (2013.01); *B23K 9/16* (2013.01); *B23K 9/321* (2013.01); *B23K 9/322* (2013.01); *B23K 13/01* (2013.01); *B23K 13/02* (2013.01); *B23K 37/003* (2013.01); *B23K 37/006* (2013.01); *B23K 37/0247* (2013.01)

(58) Field of Classification Search
CPC ........ B23K 9/02; B23K 9/0213; B23K 9/173; B23K 13/02; B23K 3/0475; B23K 9/0953; B23K 9/126; B23K 9/322; B23K 9/321
USPC ....... 219/601, 602, 607, 610, 612, 617, 671; 219/677, 61.2, 130.01, 124.34, 130.31, 219/137 PS, 137 R, 645; 228/233.1
See application file for complete search history.

(56) References Cited

U.S. PATENT DOCUMENTS

| | | | |
|---|---|---|---|
| 3,612,806 A | 10/1971 | Lewis | |
| 3,619,548 A | 11/1971 | Cavagnero | |
| 4,709,569 A | 12/1987 | Sabroff | |
| 5,319,179 A | 6/1994 | Joecks | |
| 5,343,023 A | 8/1994 | Geissler | |
| 5,461,215 A | 10/1995 | Haldeman | |
| 5,708,253 A | 1/1998 | Bloch | |
| 6,043,471 A | 3/2000 | Wiseman | |
| 6,162,509 A | 12/2000 | Cherico | |
| 6,265,701 B1 | 7/2001 | Bickel | |
| 6,333,484 B1 | 12/2001 | Foster | |
| 6,365,236 B1 | 4/2002 | Maloney | |
| 6,861,617 B2 | 3/2005 | Dull | |
| 7,156,277 B2 | 1/2007 | Ishikawa | |
| 7,922,812 B2 | 4/2011 | Ciulik | |
| 8,695,375 B2 | 4/2014 | Kirkwood | |
| 2002/0121512 A1* | 9/2002 | Thorpe | H05B 6/104 219/645 |
| 2005/0224562 A1* | 10/2005 | Prevey | B23K 9/00 228/233.1 |
| 2006/0289492 A1 | 12/2006 | Thomas | |
| 2009/0134133 A1 | 5/2009 | Mokadem | |
| 2009/0205453 A1 | 8/2009 | Oyekanmi | |
| 2011/0284527 A1 | 11/2011 | Holverson | |

FOREIGN PATENT DOCUMENTS

| | | | |
|---|---|---|---|
| CN | 101346800 | | 1/2009 |
| CN | 101491856 | | 7/2009 |
| CN | 103038016 | | 4/2013 |
| CN | 202934266 | | 5/2013 |
| CN | 103322569 | | 9/2013 |
| DE | 10047492 A1 | | 4/2002 |
| DE | 102013104548 | | 3/2014 |
| EP | 1149653 | | 10/2001 |
| FR | 2823459 | | 10/2002 |
| GB | 1460140 | | 12/1976 |
| GB | 2463694 A | | 3/2010 |
| JP | 06015447 | | 1/1994 |
| JP | 2003019562 A | * | 1/2003 |
| RU | 2077415 | | 4/1997 |
| RU | 2098247 | | 12/1997 |
| RU | 2125310 | | 1/1999 |
| WO | 0193641 | | 12/2001 |

OTHER PUBLICATIONS

International Search Report for application No. PCT/US2011/024577 dated Aug. 18, 2011.
International Search Report from PCT application No. PCT/US2015/055185, dated Feb. 12, 2016, 14 pgs.
International Search Report from PCT application No. PCT/US2015/055186, dated Feb. 10, 2016, 14 pgs.

* cited by examiner

REDUCED-DISTORTION HYBRID INDUCTION HEATING/WELDING ASSEMBLY

CROSS REFERENCE TO RELATED APPLICATIONS

This application claims priority from and the benefit of U.S. Provisional Patent Application Ser. No. 62/063,678, entitled "WELDING DISTORTION REDUCTION UTILIZING INDUCTION HEATING," filed Oct. 14, 2014, U.S. Provisional Patent Application Ser. No. 62/063,688, entitled "WELDING PRODUCTIVITY IMPROVEMENT UTILIZING INDUCTION HEATING," filed Oct. 14, 2014, and U.S. Provisional Patent Application Ser. No. 62/063, 698, entitled "METAL WORKING INDUCTION HEATING HEAD CONFIGURATIONS," filed Oct. 14, 2014, each of which is hereby incorporated by reference in its entirety for all purposes.

BACKGROUND

The present disclosure relates generally to the field of welding systems and processes, and more particularly to welding systems and processes that utilize induction heating as an additional source of heating energy.

Productivity is of high importance in any manufacturing operation. In many manufacturing operations, welding of workpieces is an important and integral part of producing high quality assemblies. A number of welding systems have been used and are being developed, including gas metal arc welding (GMAW), gas tungsten arc welding (GTAW), shielded metal arc welding (SMAW), submerged arc welding (SAW), and so forth. And all of these may be used depending upon such factors as the parts to be joined, the size and thicknesses of the materials, the final assembly desired, and the materials used.

In some contexts, it has been proposed to utilize secondary heat sources, such as induction heating, in conjunction with welding systems. Such processes are sometimes referred to as "hybrid induction welding" processes. Hybrid induction welding can produce welds at higher speeds, with less pre-weld preparation, and using fewer consumables compared to processes such as arc welding alone. Moreover, supplemental heating can change the cooling rate of the weld, which can improve the quality of the finished weld. All fusion welding processes, where a metal is melted in order to form a weld joint, involve the application of, or generation of, heat in some form. Hybrid induction welding processes add heat from an induction heating head or source which improves the productivity. But, the addition of extra heat can be detrimental—some alloys are sensitive to temperature and higher temperatures or larger heated areas can be detrimental to the quality and properties of the weld or the heat affected zone adjacent to the weld. Added heat can cause increased distortion resulting in welds which must be straightened after the weld, or which require additional processing post-welding.

There continue to be needs for improvement in such hybrid induction welding processes, however, particularly for addressing such drawbacks in existing systems.

BRIEF DESCRIPTION

The present disclosure sets forth embodiments of metal working systems and processes, such as welding systems and processes that improve performance and efficiency by the use of induction heating. In certain embodiments, stresses and distortion may be controlled and reduced by using induction heating and welding arc heating together. Certain novel arrangements of induction heating heads, coils, and configurations may contribute to the improvements. Moreover, unique gas formulations, gas and wire combinations, and so forth, may be used due to the combination of heating by the welding arc and the induction heating source.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

A hybrid induction metal working process is disclosed that utilizes an induction heating source in conjunction with a metal working system, such as a welding system. While the embodiments are described herein as welding processes, it should be born in mind that they may be metal working processes more generally, such as cutting operations, cladding operations, bending operations, heat treating operations, preparation and post working operations, and so forth. In at least some of the embodiments described, a GMAW process is assumed that utilizes one or more welding power sources, one or more welding torches receiving power and shielding gas, and one or more wire feeders that provides the needed power, gas and welding wire electrode through the one or more welding torches.

Moreover, the disclosed embodiments may be used in conjunction with one or more of the systems and processes set forth in the following, each of which is hereby incorporated by reference in its entirety for all purposes: U.S. patent application Ser. No. 13/111,433, entitled "AUXILIARY WELDING HEATING SYSTEM," filed by Holverson et al. on May 19, 2011; U.S. patent application Ser. No. 14/280,164, entitled "INDUCTION HEATING SYSTEM," filed by Beistle et al. on May 16, 2014; U.S. patent application Ser. No. 14/280,197, entitled "INDUCTION HEATING SYSTEM TEMPERATURE SENSOR ASSEMBLY," filed by Verhagen et al. on May 16, 2014; U.S. patent application Ser. No. 14/280,227, entitled "INDUCTION HEATING SYSTEM TRAVEL SENSOR ASSEMBLY," filed by Garvey et al. on May 16, 2014; U.S. patent application Ser. No. 14/494,248, entitled "METAL HEATING AND WORKING SYSTEM AND METHOD," filed by Albrecht et al. on Sep. 23, 2014; U.S. patent application Ser. No. 14/532,695, entitled "LARGE SCALE METAL FORMING," filed by Jones et al. on Nov. 4, 2014; and U.S. patent application Ser. No. 14/705,738, entitled "LARGE SCALE METAL FORMING CONTROL SYSTEM AND METHOD," filed by Jones et al. on May 6, 2015.

Figure 1:
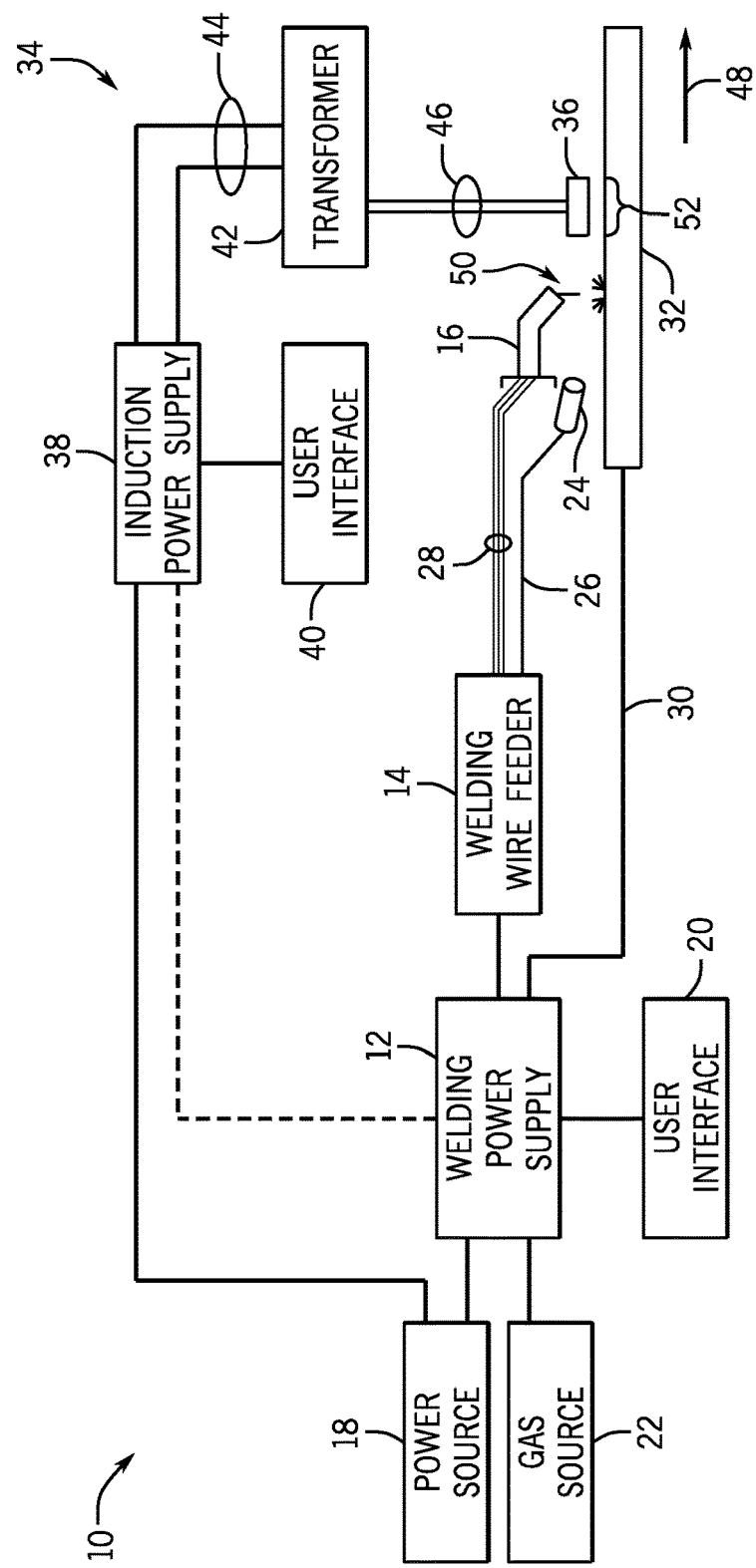
FIG. 1 is a block diagram of an exemplary welding system including an induction heating system configured to increase temperatures of a weld location ahead of the welding process.

Turning now to the drawings, FIG. 1 illustrates an exemplary welding system 10 which powers, controls, and provides consumables to a welding operation. The welding system 10 includes a welding power supply 12 (or multiple welding power supplies 12, in certain embodiments), a wire feeder 14 (or multiple mire feeders 14, in certain embodiments), and a welding torch 16 (or multiple welding torches 16, in certain embodiments). The power supply 12 may be a power converter or an inverter based welding power supply (or multiple power supplies that may not be the same type) requiring a power source 18. In certain embodiments, multiple power supplies 12 (of the same or different types) may be connected to one wire feeder 14 and welding torch 16. Many different circuit designs may be provided in the power source 18, and many different welding regimes may be envisaged (e.g., direct current, alternating current, pulsed, short circuit, etc. Any of these conventional circuits and process technologies may be used in conjunction with the present induction heating techniques. In other embodiments, the welding power supply 12 may be a generator or alternator welding power supply which may include an internal combustion engine. The welding power supply 12 may also include a user interface 20 for adjusting various welding parameters such as voltage and current, and for connecting a power source 18, if required. Additionally, a gas source 22 may be coupled to the welding power supply 12. The gas source 22 is the source of the shielding gas that is supplied to the welding torch 16. In addition, in certain embodiments, the gas source 22 also supplies shielding gas to an auxiliary shielding gas diffuser 24. For example, in certain embodiments, the gas source 22 may supply argon gas. As will be appreciated, the shielding gas is applied to the location of the liquid weld pool by the welding torch 16 and/or the auxiliary gas diffuser 24 to prevent absorption of atmospheric gases which may cause metallurgical damage to the weld. As shown, the welding power supply 12 is coupled to the welding wire feeder 14. For example, the welding power supply 12 may be coupled to the welding wire feeder 14 by a feeder power lead, a weld cable, a gas hose, and a control cable.

The welding wire feeder 14 shown in the illustrated embodiment provides welding wire to the welding torch 16 for use in the welding operation. A variety of welding wires may be used. For example, the welding wire may be solid steel, solid aluminum, solid stainless steel, metal cored wire, flux cored wire, flat strip electrode, and so forth. The embodiments described herein may be used with any suitable type of electrode (or cold wire feed, in certain embodiments), and any suitable wire composition. Furthermore, the thickness of the welding wire may vary depending on the welding application for which the welding wire is used. For example, the welding wire may be 0.045", 0.052", 1/16", 3/32", 1/8", or any other diameter. Furthermore, the welding wire feeder 14 may enclose a variety of internal components such as a wire feed drive system, an electric motor assembly, an electric motor, and so forth. The welding wire feeder 14 may further include a control panel (not shown) that allows a user to set one or more wire feed parameters, such as wire feed speed. In the illustrated embodiment, the auxiliary shielding gas diffuser 24 is also coupled to the welding wire feeder 14 by a gas hose 26 (or may be connected directly to the gas source and controlled from the user interface 20). However, the welding wire feeder 14 may be used with any wire feeding process including gas operations (gas metal arc welding (GMAW)), gasless operations (shielded metal arc welding (SMAW) or self-shielding flux cored arc welding (FCAW)), submerged arc welding (SAW), and so forth.

As shown, the welding wire is fed to the welding torch 16 through a first cable 28. The first cable 28 may also supply gas to the welding torch 16, and may also supply cooling water to the welding torch 16. As further shown, a second cable 30 couples the welding power supply 12 to a workpiece 32 (typically via a clamp) to complete the circuit between the welding power supply 12 and the welding torch 16 during a welding operation.

The exemplary welding system 10 also includes an induction heating system 34. As mentioned above, the induction heating system 34 includes an induction heating coil 36 and an induction power supply 38. The induction power supply 38 includes a user interface 40. The user interface 40 may include buttons, knobs, dials, and so forth, to allow an operator to regulate various operating parameters of the induction power supply 38. For example, the user interface 40 may be configured to enable an operator to set and adjust the frequency of the alternating current produced by the induction power supply 38. Similarly, the user interface 40 may enable an operator to select a desired output temperature of the induction heating coil 36. The user interface 40 may also include one or more displays configured to provide system feedback to the operator (e.g., real-time temperature of the induction heating coil 36, travel speed of the induction heating coil 36 relative to the workpiece 32, and so forth). In certain embodiments, the induction power supply 38 may be coupled to a step-down transformer 42 with electrical wire conductors 44. More specifically, two electrical wire conductors 44 are routed from the induction power supply 38 to the transformer 42, and each electrical wire conductor 44 is routed inside a flexible tube or conduit. Furthermore, the induction heating system 34 may be an air-cooled or a liquid-cooled system. For example, a coolant may flow inside the flexible tubes routing each of the electrical wire conductors 44. In certain embodiments, one flexible tube routing an electrical wire conductor 44 contains a flowing coolant which enters the transformer 42, and another flexible tube routing an electrical wire conductor 44 contains a flowing coolant which flows from the transformer 42 to a heat exchanger or other device that removes heat from the coolant.

The alternating electrical current exits the transformer 42 and is supplied to the induction heating coil 36 by electrical conductors 46. In certain embodiments, the electrical conductors 46 may have a hollow core and may also route the flowing coolant through the induction heating coil 36. In the illustrated embodiment, the induction heating coil 36 is disposed proximate to the workpiece 32. As the alternating current flows through the induction heating coil 36, eddy currents are generated and induced within the workpiece 32. The eddy currents flow against the electrical resistivity of the workpiece 32, thereby generating localized heat in the workpiece 32. As shown, the induction heating coil 36 is positioned ahead of the welding torch 16. In other words, for a welding torch 16 operating and traveling in a direction 48, the induction heating coil 36 is placed in front of the welding torch 16 (i.e., along the weld joint and before a welding arc 50 created by the welding torch 16). As a result, the induction heating coil 36 heats a localized area 52 of the workpiece 32 immediately ahead of the welding arc 50, thereby raising the temperature of the localized area 52 just ahead of the welding arc 50. As will be appreciated by those skilled in the art, such temperatures are generally substantially higher than conventional "preheat" temperatures (and may reach as high as the melting point). Consequently, as the welding torch 16 travels in the direction 48, less heat from welding arc 50 is needed to bring the localized area 52 of the workpiece 32 to melting temperature. Therefore, more heat generated by the welding arc 50 may be used to melt the welding wire so that the welding wire may be fed to the welding arc at higher rates, which enables the welding torch 16 to complete the weld of the workpiece 32 at higher speeds. As such, the combination of features of the hybrid induction heating/welding assembly 90 described herein may lead to double (or even triple) the welding rate as compared to comparable conventional welds.

As shown, the welding power supply 12 and the induction power supply 38 may also be coupled in certain embodiments. For example, the welding power supply 12 and the induction power supply 38 may be coupled by a hard wire, through a wireless connection, over a network, and so forth. As discussed in detail below, the welding power supply 12 and the induction power supply 38 may exchange data and information during the operation of the exemplary welding system 10. More particularly, the welding power supply 12 and the induction power supply 38 may function in cooperation (e.g., utilize feedback from one another) to adjust various operating parameters of the exemplary welding system 10.

It should be noted that modifications to the exemplary welding system 10 of FIG. 1 may be made in accordance with aspects of the present disclosure. Although the illustrated embodiments are described in the context of an arc welding process, the features of the present embodiments may be utilized with a variety of other suitable welding or cutting systems and processes. For example, the induction heating system 34 may be used with a plasma cutting system or with a plate bending system. More specifically, the induction heating system 34 may be disposed ahead of a plasma cutter to increase the temperature of a localized area ahead of the plasma cut, thereby enabling increased cutting speeds. Furthermore, while the induction heating system 34 is positioned ahead of the welding torch 16 in the present embodiment, the induction heating system 34 may be positioned in other locations. For example, the induction heating system 34 may be positioned behind the welding torch 16 to provide a heat treatment to a weld location after the workpiece 32 is welded and fused. Similarly, certain embodiments may include more than one induction heating system 34 or induction heating coil 36 (i.e., a first induction heating system 34 or induction heating coil 36 positioned ahead of the welding torch 16 to raise the temperature of the localized area 52, a second heating system 34 or induction heating coil 36 positioned behind the welding torch 16 to provide a heat treatment of a weld location that has been fused), and/or a third heating system 34 or induction heating coil 36 to heat the workpiece 32 ahead or behind of the welding process to reduce the rate of cooling of the weld to prevent metallurgical damage.

Figure 2:
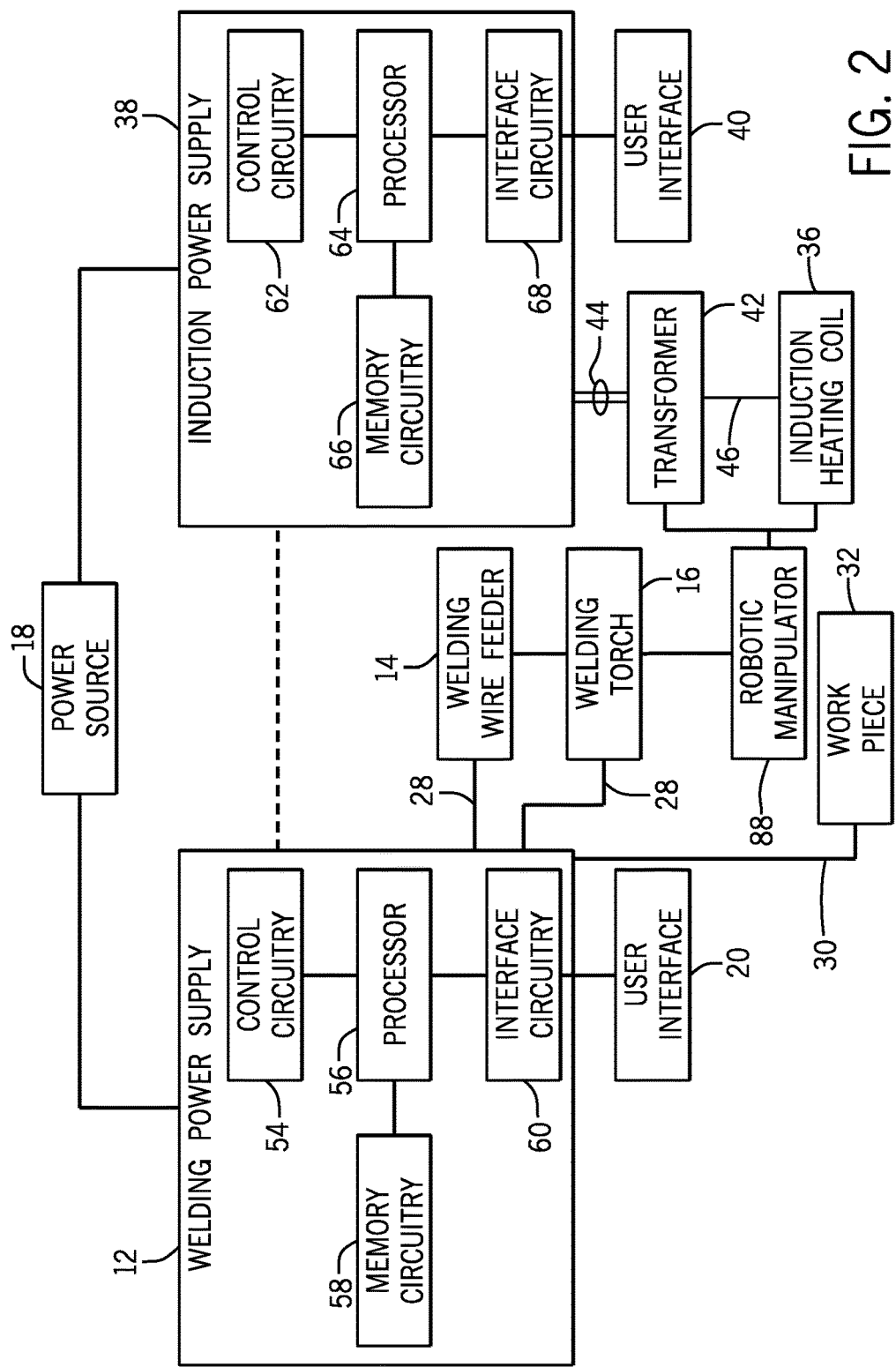
FIG. 2 is a block diagram illustrating exemplary functional components of the welding system and induction heating system of FIG. 1, in accordance with aspects of the present disclosure.

FIG. 2 is a block diagram illustrating certain of the internal components of the exemplary welding system 10. As discussed above, the power source 18 may power one or more welding power supplies 12 and/or one or more induction power supplies 38. Each welding power supply 12 provides power to a welding wire feeder 14 or to the welding torch 16, and the welding power supply 12 is coupled to the workpiece 32, thereby completing the circuit between the welding power supply 12 and the welding torch 16 during a welding operation. Each induction power supply 38 generates an alternating electrical current that is supplied to a transformer 42, which subsequently routes the current to an induction heating coil 36. As mentioned above, the welding power supply 12 and the induction power supply 38 may be coupled and configured to exchange information and data (e.g., operating parameters, settings, user input, etc) to enable the welding power supply 12 and the induction power supply 38 to function cooperatively.

The welding power supply 12 includes several internal components to regulate various operating parameters of the welding system 10. In the illustrated embodiment, the welding power supply 12 includes control circuitry 54, a processor 56, memory circuitry 58, and interface circuitry 60. The control circuitry 54 is configured to apply control signals to the welding power supply 12 and/or the welding wire feeder 14. For example, the control circuitry 54 may provide control signals to the welding wire feeder 14 relating to the voltage or current provided by the welding power supply 12. The control circuitry 54 may also provide control signals for regulating the operation of the welding wire feeder 14 such as pulse width modulated (PWM) signals to regulate a duty cycle for a motor assembly in the welding wire feeder 14, and so forth.

The control circuitry 54 is further coupled to the processor 56, memory circuitry 58 and interface circuitry 60. The interface circuitry 60 is coupled to the user interface 20 of the welding power supply 12. As discussed above, the user interface 20 is configured to enable an operator to input and control various settings of the welding power supply 12. For example, the user interface 20 may include a menu for selecting a desired voltage or current output to the welding wire feeder 14. Additionally, the user interface 20 may include a menu or list of welding processes or welding wire materials and diameters. As will be appreciated, different welding processes, welding wire materials, and welding wire diameters may have different characteristics and may require differing configurations for various operating parameters. For example, configuration parameters requiring differing values may include voltage output, current output, wire feed speed, wire feed torque, and so forth. Preset values for such configuration parameters, as well as others, may be stored in the memory circuitry 58 for each of a variety of welding processes, welding wire materials, and welding wire diameters.

By way of example, a user may select a welding process from a menu of a plurality of different welding processes displayed on the user interface 20 of the welding power supply 12. The user interface 20 communicates the selection of the welding process to the interface circuitry 60, which communicates the selection to the processor 56. The processor 56 then retrieves the particular configuration parameters for the welding process stored in the memory circuitry 58. Thereafter, the processor 56 sends the configuration parameters to the control circuitry 54 in order that the control circuitry 54 may apply appropriate control signals to the welding wire feeder 14. In certain embodiments, as discussed below, the control circuitry 54 of the welding power supply 12 may also communicate the configuration parameters to the induction power supply 38.

In the illustrated embodiment, the induction power supply 38 includes control circuitry 62, a processor 64, memory circuitry 66, and interface circuitry 68. The control circuitry 62 is configured to apply control signals to the induction power supply 38 and/or the transformer 42. For example, the control circuitry 62 may provide control signals relating to the alternating electrical current (e.g., alternating current frequency) supplied by the induction power supply 38 to the transformer 42. Additionally, the control circuitry 62 may regulate the operation of a cooling system used with the induction power supply 38 and/or the transformer 42. As mentioned above, the induction heating system 34 may use air or a coolant to provide circulating cooling throughout the induction heating system 34. For example, the control circuitry 62 may regulate a flow of a liquid coolant through the transformer 42 and the induction heating coil 36 to maintain a desired temperature of the induction heating system 34.

The control circuitry 62 is further coupled to the processor 64, memory circuitry 66, and interface circuitry 68. The interface circuitry 68 is coupled to the user interface 40 of the induction power supply 38. As mentioned above, the user interface 40 of the induction power supply 38 enables an operator to regulate one or more operating parameters or settings of the induction power supply system 38. For example, the user interface 40 may enable a user to select a particular design of the induction heating coil 36 from a menu of designs. As will be appreciated, different induction heating coil 36 designs may have different configuration parameters. For example, different designs may have different maximum operating temperatures, and may require different frequencies of alternating current to achieve a desired temperature. Similarly, the coolant used to cool the induction heating system 34 may have different configuration parameters (e.g., heat transfer coefficients, viscosities, flow rates, and so forth). Preset values for such configuration parameters, as well as others, may be stored in the memory circuitry 66. For example, the user interface 40 may communicate a user selection of the induction heating coil 36 designs to the interface circuitry 68, which may communicate the selection to the processor 64. The processor 64 may then retrieve the particular configuration parameters for the induction heating coil 36 stored in the memory circuitry 66. Thereafter, the processor 64 sends the configuration parameters to the control circuitry 62 in order that the control circuitry 62 may apply appropriate control signals to the induction power supply 38 and the transformer 42.

As mentioned above, the welding power supply 12 and the induction power supply 38 may be coupled to one another by a hard wire, wireless connection, network connection, or the like. In particular, the welding power supply 12 and the induction power supply 38 may be configured to send and receive data and information to one another relating to the operating of the welding system 10. For example, the welding power supply 12 and the induction power supply 38 may communicate with one another to coordinate the speed of the induction heating coil 36 and the welding torch 16 along the workpiece 32. As described herein, in certain embodiments, the induction heating coil 36 and the welding torch 16 are both designed for automated operation. As a result, the welding power supply 12 and the induction power supply 38 may be coupled and configured to communicate and actively adjust a distance between the induction heating coil 36 and the welding arc 50, as the induction heating coil 36 and the welding torch 16 travel along the workpiece 32 in the direction 48. For example, in certain embodiments, the welding torch 16 and the induction heating coil 36 may each have sensors configured to measure a travel speed or temperature along the workpiece 32.

For further example, the welding power supply 12 may communicate a user selected welding process (i.e., a welding process selected by an operator through the user interface 20) to the induction power supply 38. More specifically, the control circuitry 54 of the welding power supply 12 may communicate the welding process selection to the control circuitry 62 of the induction power supply 38. Thereafter, the control circuitry 62 of the induction power supply 38 may modify any of a variety of operating parameters based on the user selected welding process. For example, the control circuitry 62 may begin or end the process, or regulate the frequency or amplitude of the alternating current provided to the induction heating coil 36 or the flow rate of a coolant through the transformer 42 and/or the induction heating coil 36 to achieve a desired maximum temperature of the induction heating coil 36 based on the welding process selected. More specifically, for a selected welding process, the processor 64 may retrieve configuration parameters for the selected welding process from the memory circuitry 66 and send the configuration parameters to the control circuitry 62. Similarly, the control circuitry 62 of the induction power supply 38 may send operating information or data to the control circuitry 54 of the welding power supply 12. For example, the control circuitry 62 may send temperature data (e.g., maximum temperature or real-time temperature) of the induction heating coil 36 to the control circuitry 54 of the welding power supply 12. Thereafter, the control circuitry 54 of the welding power supply 12 may adjust one or more operating parameters of the welding power supply and/or welding wire feeder 14 in response to the data received from the induction power supply 38. For example, the control circuitry 54 of the welding power supply 12 may begin or end the welding process or adjust the wire feed speed or torque of the welding wire feeder 14 based on the temperature data of the induction heating coil 36 received from the control circuitry 62 of the induction power supply 38. As will be appreciated, for higher temperatures provided by the induction heating coil 36 to the localized area 52 of the workpiece 32 ahead of the welding arc 50, a slower or faster wire feed speed may be needed.

It should be noted that in certain embodiments, the power supplies and control circuits used for generation and control of induction heating power and welding power may be joined. That is, some or all of the circuits may be provided in a single power supply, and certain of the circuits may serve both functions (e.g., operator interface components). Additionally, a central controller may provide coordination and synchronization commands to both the welding/cutting system and the induction system.

It should also be noted that while reference is sometimes made in the present disclosure to advancement or movement of the welding torch 16 and adjacent induction heating system 34, depending upon the welding system design, the welding torch 16 and the induction heating system 34 may indeed be displaced, while in other systems these may remain generally stationary, with the workpiece or workpieces being moved. Such may be the case, for example, in certain robotic or automated operations, in submerged arc applications, and so forth. Both scenarios are intended to be covered by the present disclosure, and references to moving the welding torch 16 and the induction heating system 34 should be understood to include any relative motion between these components and the workpiece(s) 32.

Figure 3:
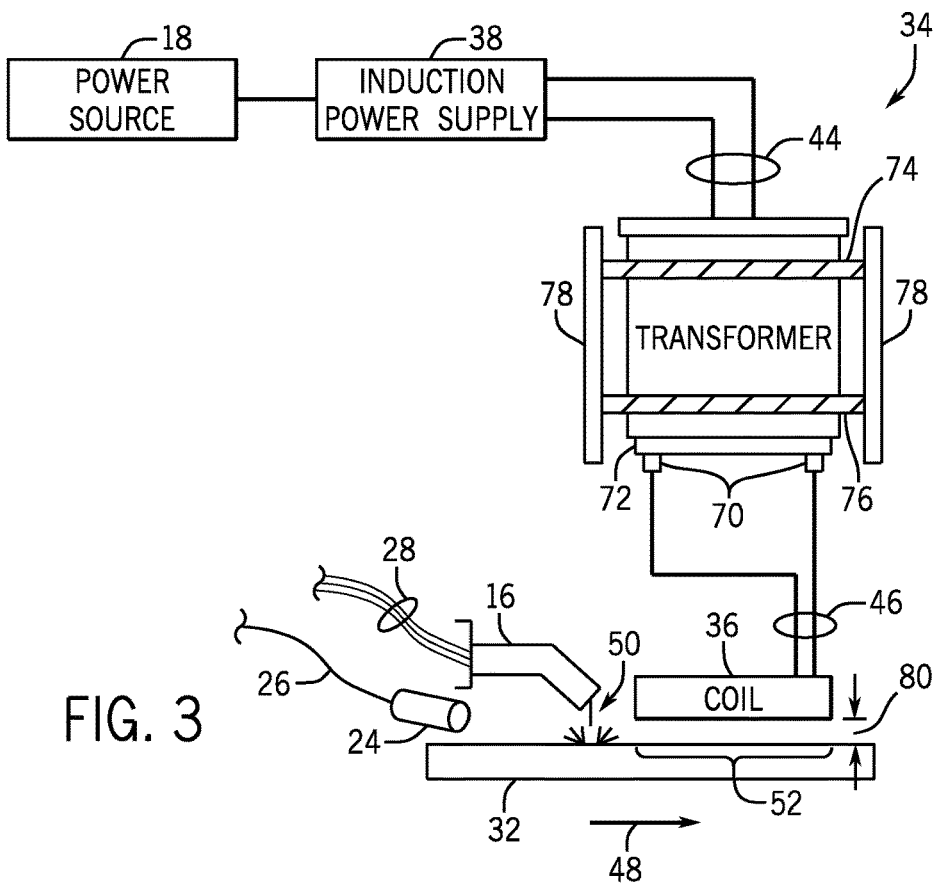
FIG. 3 is a block diagram illustrating exemplary functional components of the induction heating system of FIG. 1, in accordance with aspects of the present disclosure.

FIG. 3 is a block diagram of an embodiment of the induction heating system 34 of FIG. 1, illustrating the induction power supply 38, the step-down transformer 42, and the induction heating coil 36 positioned ahead of the welding arc 50 produced by the welding torch 16. As discussed above, the transformer 42 is coupled to the induction power supply 38 by electrical wire conductors 44. The induction power supply 38 supplies an alternating current to the transformer 42 through the electrical wire conductors 44. From the transformer 42, the alternating current is supplied to the induction heating coil 36 by electrical conductors 46. Specifically, the alternating current exits the transformer 42 through power connections 70 attached to a base 72 of the transformer 42. The electrical conductors 46 are coupled to the power connections 70, e.g., by soldering, brazing, or bolting. As mentioned above, in certain embodiments, the electrical conductors 46 may have a hollow core, thereby enabling a coolant to flow through the electrical conductors 46 and the induction heating coil 36 to regulate a maximum temperature of the induction heating coil 36. In other words, the electrical conductors 46 and the induction heating coil 36 may carry the alternating current and a coolant flow.

As shown, the transformer 42 is supported by a top plate 74 and a bottom plate 76. In certain embodiments, the top and bottom plates 74 and 76 may be formed from a ceramic or other electrically insulating material. The top and bottom plates 74 and 76 are further coupled to a metal, ceramic, or polymer frame 78. The metal, ceramic, or polymer frame 78 may be configurable such that a distance 80 between the workpiece 32 and the induction heating coil 36 can be adjusted. For example, the metal frame 78 may further be secured to a robotic manipulator 88 (e.g., see, FIG. 2) configured to move and guide the induction heating system 34 in multiple planes along the weld joint of the workpiece 32. Furthermore, the robotic manipulator 88 may be coupled to the control circuitry 62 of the induction power supply 38 such that the control circuitry 62 may regulate the movement and speed of the induction heating coil 36 and/or the entire induction heating system 34 relative to the workpiece 32.

The purpose of the induction heating coil 36 is to carry electrical current from the transformer 42 or power supply 12 to the part (e.g., the workpiece 32) which is to be heated. The induction heating coil 36 is essentially a direct electrical short circuit between the two poles of the transformer 42 or the power supply 12. If any damage occurs to the induction heating coil 36, it may quickly overheat at the damaged area and melt. In certain embodiments, the induction heating coil 36 may be a metal tube which has been bent or formed or fabricated into a shape which will heat the part (e.g., the workpiece 32). Water or other coolant flows through the interior of the induction heating coil 36 to keep the induction heating coil 36 from overheating. If the coolant reaches the boiling point such that a gas bubble is formed on the interior surface of the induction heating coil 36, that gas bubble forms a barrier which prevents the coolant from removing heat from that area of the coil interior surface. If not monitored, the induction heating coil 36 may be damaged by localized melting at the location of that bubble. For example, a small indentation or a bending of the induction heating coil 36 into a shape different that the original design shape, may cause turbulence in the flow or a stagnant area of coolant flow, which is a possible location for the coolant to heat to above the boiling point. Also, cold working of a metal will decrease the electrical conductivity of the induction heating coil 36 at the local area of deformation, which can cause that spot on the induction heating coil 36 to overheat.

The electrical conductivity property of the induction heating coil 36 is an important physical characteristic. Any resistance heating of the induction heating coil 36 will reduce the efficiency of the induction heating process. Energy which is used to resistance heat the induction heating coil 36 may then be lost to the coolant, and not available to heat the part (e.g., the workpiece 32). The electrical conductivity of a metal is reduced by bending or forming, and by alloying ingredients. The coil metal, if it is bent or formed during fabrication, will have the electrical resistance increased in that area of deformation. A lower strength metal will exhibit a lesser decrease in conductivity when deformed than a higher strength metal. So, the induction heating coil 36 may be fabricated from a pure or nearly pure metal in the lowest strength mechanical condition. Consequently, in certain embodiments, the induction heating coil 36 is protected from any bending or other mechanical damage.

Figure 4:
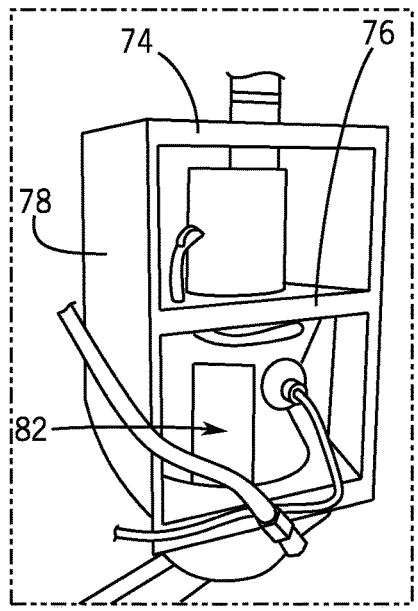
FIG. 4 is a perspective view of internal components on an embodiment of a hybrid induction heating/welding assembly, including an embodiment of a protective housing that entirely surrounds an induction heating coil, in accordance with aspects of the present disclosure.

In particular, as illustrated in FIG. 4, in certain embodiments, the induction heating coil 36 may be protected by using an outer sheath or structure as a coil protective housing 82. For example, in certain embodiments, the induction heating coil 36 may be entirely surrounded by the coil protective housing 82. Such a structure must not be electrically conductive to prevent heating by the induction heating coil 36. Higher strength polymer and ceramic materials may be used to prevent mechanical damage to the induction heating coil 36. Ceramic materials may be shaped prior to firing and polymer materials may be cast or machined to provide support to prevent damage to the induction heating coil 36. For example, in certain embodiments, the coil protective housing 82 may be a single piece, or a multiple piece structure. A multiple piece structure may be made from pieces which are all the same material, or may be made from a plurality of pieces, each of which can be different materials or the same materials. For example, in certain embodiments, the coil protective housing 82 may be made from two pieces of high density polypropylene, so the two pieces could be taken apart and easily removed and replaced. Additionally, if heat radiating from the heated part (e.g., the workpiece 32) is sufficient to cause damage to the coil protective housing 82, then multiple pieces may be used, where part of the coil protector housing 82 is made from a ceramic material that can withstand the heat near the heated part (e.g., the workpiece 32). Some ceramic materials are susceptible to heating by induction. In the case of the use of these types of ceramics, the ceramic material of the coil protective housing 82 may be shielded from the electromagnetic radiation generated by the passage of electrical current through the induction heating coil 36. In such embodiments, an electromagnetic flux concentrator material 84 may be placed between the induction heating coil 36 and the ceramic piece or pieces of the coil protective housing 82.

When the induction heating coil 36 is being used to produce a heated spot or heated line in the case of a thermal forming process, to produce a heated line ahead of the welding torch 16 in the case of hybrid induction arc welding, or to produce a heated line ahead of a cutting torch in the case of hybrid induction cutting, additional ceramic material may be added to further protect the induction heating coil 36 from the heat of the process. The choice of the material may depend on the specific properties of the material, such as wear resistance, resistance to erosion by flowing liquid metal or liquid metal oxides or other heated material, or resistance to the radiative heat of a welding arc or a plasma cutting arc. The susceptibility to heating by the induction heating coil 36 is a secondary material property while the wear, resistance to erosion, or the resistance to radiative heat from an arc (e.g., the welding arc 50) is the primary property upon which the material selection is made. Such ceramic components used to protect the induction heating coil 36 may, themselves, be protected from heating by the induction heating coil 36, by placement of flux concentrator material in the path of the radiated electromagnetic field produced by the induction heating coil 36 to prevent the electromagnetic field from affecting the ceramic material.

Figure 5:
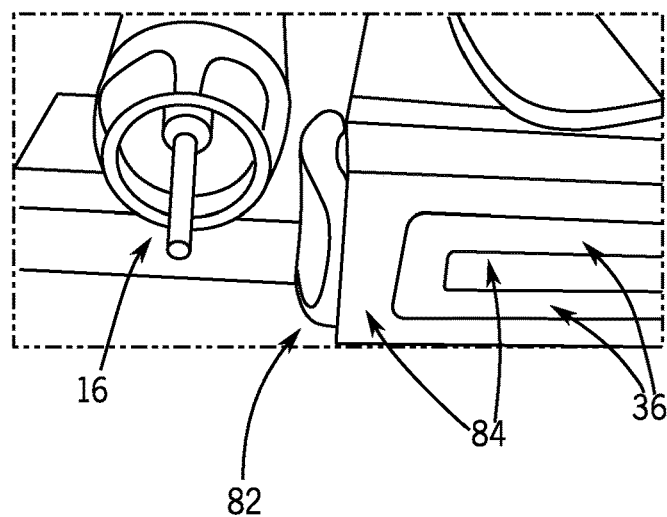
FIG. 5 is a perspective view of an embodiment of a protective housing that is disposed between an induction heating coil and a corresponding flux concentrator material and a welding torch, in accordance with aspects of the present disclosure.

For example, FIG. 5 illustrates an embodiment of an induction heating coil 36 with a ceramic coil protective housing 82 using the flux concentrator material 84 between the induction heating coil 36 and the ceramic coil protective housing 82. More specifically, as illustrated in FIG. 5, in certain embodiments, the flux concentrator material 84 may be disposed around the induction heating coil 36 The flux concentrator material 84 utilized to reduce or prevent wear and other degradation in this way may include materials that are heat resistant, non-metallic, wear resistant, and electrically insulating such as fiber reinforced materials, tempered glasses or composites.

Figure 6:
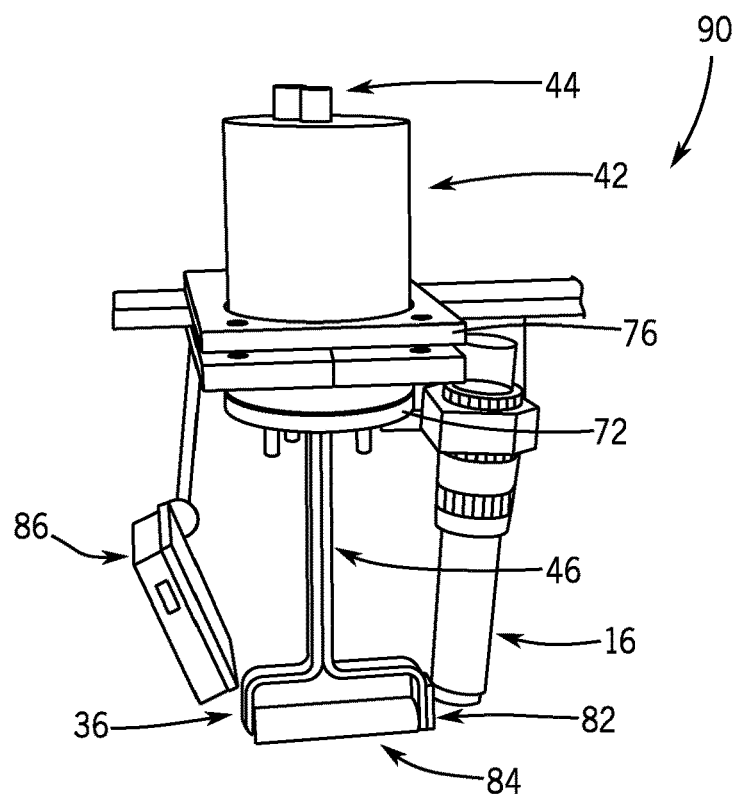
FIG. 6 is a perspective view of internal components of an embodiment of the hybrid induction heating/welding assembly, in accordance with aspects of the present disclosure.

Another method to prevent damage to the induction heating coil 36 is to sense that the induction heating coil 36 is likely to be damaged by collision, and to activate a motion device or multiple motion devices to prevent the collision and the damage. For example, as illustrated in FIG. 6, in certain embodiments, one or more sensors 86 may be used to protect the coil from collision and damage. For example, in certain embodiments, a laser height/distance sensor 86 (or other position-detecting sensor) may be used for sensing to prevent the induction heating coil 36 from colliding with a non-flat surface as it is moved along near the surface or to prevent the induction heating coil 36 from colliding with objects protruding from the surface.

As illustrated in FIG. 2, in certain embodiments, a robotic manipulator 88 or other mechanical motion system may be controlled by signals from the one or more sensors 86 to move the induction heating coil 36 to avoid collision with an object. It is also possible to use multiple laser distance sensors 86, or to have one or more laser distance sensors 86 pointing in different directions, or onto a curved surface at different locations, to provide data input to control circuitry (e.g., the control circuitry 54, 62 of the welding power supply 12 and the induction power supply 38, respectively, or some other control circuitry of the system 10), and for the control circuitry 54, 62 to control multiple robotic manipulators 88 or other mechanical motion systems to prevent collision with a curved surface, but to maintain a constant stand-off distance of the induction heating coil 36 from the surface. Alternative collision detection methods are possible, including a joint that detects a small degree of flexing. Reaching the small degree of flex, the motion may be stopped to prevent damage. In addition, sensing a higher than normal force in the system 10 may be used to sense a collision and stop the system 10 before damage occurs.

In addition, in certain embodiments, the control circuitry (e.g., the control circuitry 54, 62 of the welding power supply 12 and the induction power supply 38, respectively, or some other control circuitry of the system 10) may control the multiple robotic manipulators 88 or other mechanical motion systems to independent control position, orientation, and/or movement of the welding torch 16 and the transformer 42 and/or the induction heat coil 36 relative to the workpieces 32 being worked on. For example, the robotic manipulators 88 or other mechanical motion systems may include independent positioning systems disposed within a common housing (see, e.g., the housing 134 illustrated in FIGS. 9 and 10) of the hybrid induction heating/welding assembly 90 (see, e.g., FIGS. 7A, 7B, 9, and 10). More specifically, in certain embodiments, the independent positioning systems disposed within the common housing 134 of the hybrid induction heating/welding assembly 90 may include multi-axis positioning systems configured to independently adjust the position, orientation, and/or movement of the welding torch 16 and the transformer 42 and/or the induction heat coil 36 relative to the common housing 134 (and, thus, relative to the workpieces 32 being worked on. Accordingly, these multi-axis positioning systems form a part of the robotic manipulators 88 or other mechanical motion systems described herein.

If the induction heating coil 36 moves too far from the surface of the part (e.g., the workpiece 32) being heated by the induction heating coil 36, then the electromagnetic field coupling with the metal part will be reduced, and the energy transfer will be reduced. This condition may cause the induction heating coil 36 to overheat, and to potentially be damaged. In this instance, the one or more laser distance sensors 86 protect the induction heating coil 36 from overheating.

Figure 7A:
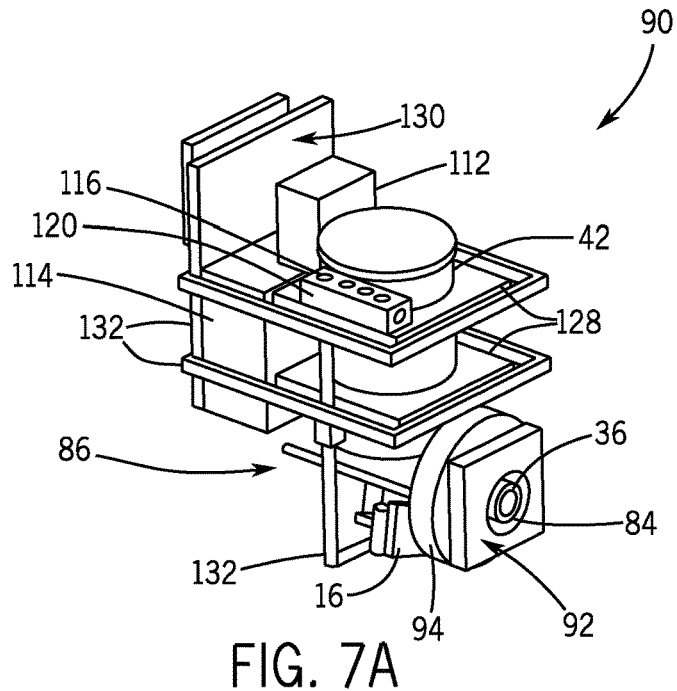
FIGS. 7A and 7B are perspective views of internal components of an embodiment of the hybrid induction heating/welding assembly, in accordance with aspects of the present disclosure.
Figure 7B:
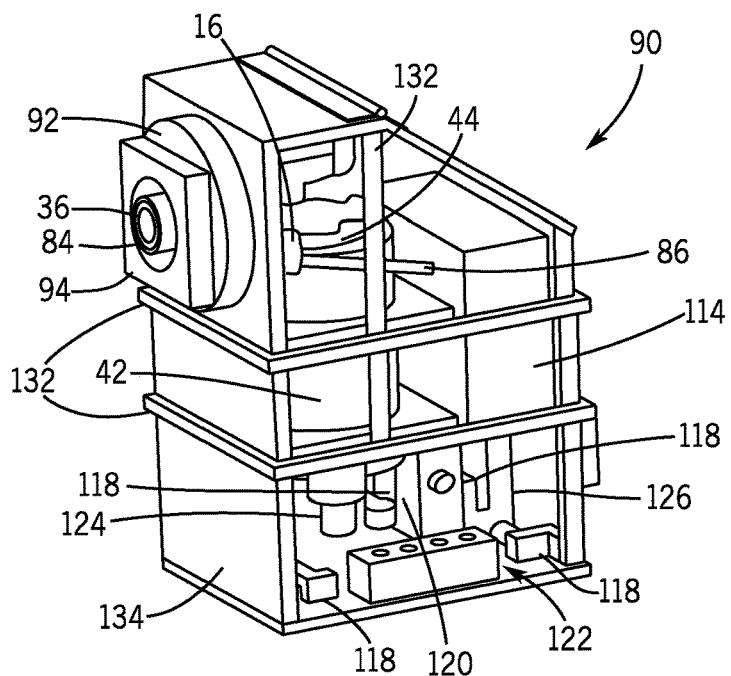

In certain embodiments, a circular air knife 92 may be used to direct a curtain of air to the surface of the metal being formed (e.g., the workpiece 32). FIGS. 7A and 7B illustrate two separate perspective views of embodiments of internal components of an induction heating head assembly 90 in accordance with aspects of the present disclosure. As illustrated, the induction heating coil 36 is used with a circular air knife 92 and water spray head 94. In the illustrated embodiment, the induction heating coil 36 is a circular coil surrounded by an electromagnetic field flux concentrator 84. However, other configurations of the induction heating coil 36 and the electromagnetic field flux concentrator 84 may also be used in conjunction with a circular air knife 92 as described herein.

Figure 8:
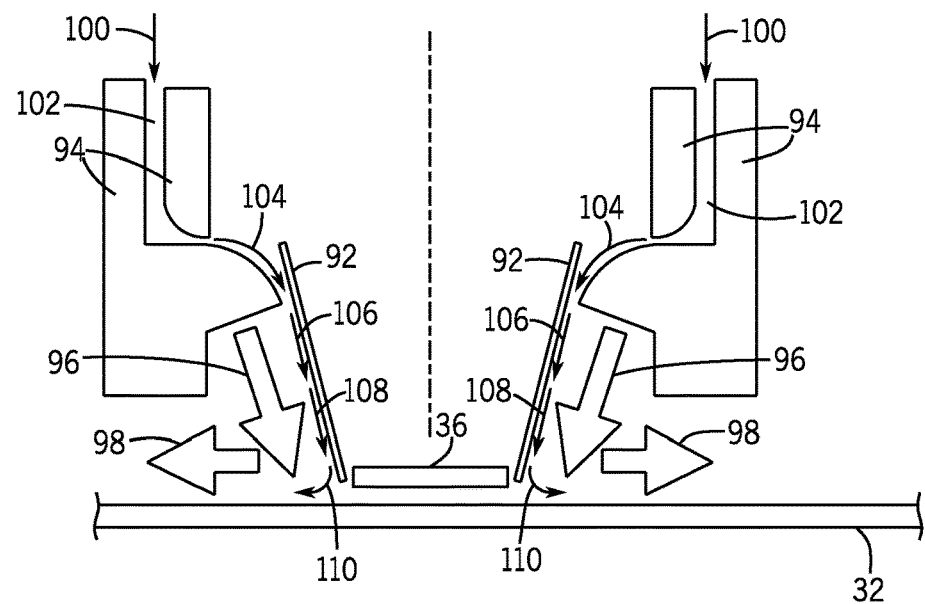
FIG. 8 is a cross-sectional side view of an embodiment of a circular air knife and a water spray head of the hybrid induction heating/welding assembly, in accordance with aspects of the present disclosure.

FIG. 8 is a cross-sectional side view of an embodiment of the circular air knife 92 and the water spray head 94. It will be appreciated that other configurations of the circular air knife 92 and the water spray head 94 may be used in different embodiments. In the embodiment illustrated in FIG. 8, the circular air knife 92 has a frustoconical shape, and the frustoconical air knife 92 is surrounded by the water spray head 94, which supplies a water spray that follows the path illustrated by arrows 96, 98 down to the workpiece 32. It should be noted that, although described herein as using water, other coolants (e.g., liquified gases such as liquid argon, solidified gases such as carbon dioxide snow, and so forth) may be used instead of water, especially to increase the cooling rate of metals that may be reactive to water.

In the illustrated embodiment, air 110 is delivered by an internal passage 102 that starts the air 110 on a downward path, then diverts the air flow radially inward toward the center of the frustoconical air knife 92, as illustrated by arrows 104. At the opening adjacent to the frustoconical air knife 92, the air delivery device passage 102 narrows and forms an air sheet which develops flow that conforms to a curved surface that the air sheet follows. The curvature of the surface ends at the same angle of flow as the corresponding frustoconical air knife 92 such that the sheet of flowing air 110 then transfers to, and follows, the surface of the frustoconical air knife 92 down to the workpiece 32. The frustoconical air knife 92 surrounds the induction heating coil 36, which is held adjacent to the workpiece 32, forming a heated area on the workpiece 32. The water spray following the path illustrated by arrows 76, 78 is directed away from the heated area on the workpiece 32 by the air flow illustrated by arrows 106, 108, 110.

As such, the frustoconical air knife 92 maintains the temperature of the metal, preventing the spread of heat to the surrounding material by conduction. The frustoconical shape of the circular air knife 92 (i.e., with the smaller end proximate the workpiece 32) provides a slight increase in local air pressure at the surface of the workpiece 32, thereby forcing the flow of air as the circular air knife 92 impinges on the workpiece 32, outward—preventing any of the water droplets from the surrounding water curtain from splashing and hitting the workpiece 32 inside the circular air knife 92. The relatively dry spot on the workpiece 32 inside the ring of impingement of the circular air knife 92 is where the induction heating coil 36 produces a heated spot. This dry area has two important objectives: 1) any water on the surface of the workpiece 32 reduces the heating efficiency of the induction; and 2) water on the surface of the workpiece 32 disrupts the reflected laser light from the surface of the workpiece 32, causing the one or more laser distance sensors 86 to detect erroneous height readings, which are used to control the robot manipulator 88 to maintain an optimum standoff distance of the induction heating coil 36.

Returning now to FIGS. 7A and 7B, as illustrated, the hybrid induction heating/welding assembly 90 includes the one or more laser height sensors 86 disposed adjacent the circular air knife 92 and/or the spray head 94 such that the one or more laser height sensors 86 may detect a distance (height) of the one or more laser height sensors 86 from a surface of the part being heated (e.g., the workpiece 32), whereby this distance may be used as a proxy for determining the position of the induction heating coil 36 from the surface of the part being heated (e.g., the workpiece 32). More specifically, the one or more laser height sensors 86 may be communicatively coupled to control circuitry (e.g., the control circuitry 54, 62 of the welding power supply 12 and the induction power supply 38, respectively, or some other control circuitry of the system 10), and the control circuitry 54, 62 may receive a signal from the one or more laser height sensors 86, and determine how to control operation of the hybrid induction heating/welding assembly 90 accordingly. For example, as described herein, the control circuitry 54, 62 may control multiple robotic manipulators 88 or other mechanical motion systems to prevent collision of the induction heating coil 36 with the surface of the part being heated (e.g., the workpiece 32), and maintain a constant stand-off distance of the induction heating coil 36 from the surface of the part being heated (e.g., the workpiece 32).

As illustrated in FIGS. 7A and 7B, in certain embodiments, the hybrid induction heating/welding assembly 90 may include a separate laser height sensor module 112 (e.g., disposed within a housing of the hybrid induction heating/welding assembly 90) that is communicatively coupled to the one or more laser height sensors 86, and the laser height sensor module 112 may be configured to receive a signal from the one or more laser height sensors 86, and to determine how to control operation of the hybrid induction heating/welding assembly 90 accordingly. For example, the laser height sensor module 112 may include its own control circuitry (e.g., one or more processors configured to execute code stored in one or more storage media, similar to the control circuitry 54, 62 described herein) for determining a distance of the induction heating coil 36 from the surface of the part being heated (e.g., the workpiece 32), and for at least partially controlling operation of the hybrid induction heating/welding assembly 90 accordingly (e.g., either individually controlling or providing coordinated control with the control circuitry 54, 62 of the welding power supply 12 and the induction power supply 38, respectively, or some other control circuitry of the system 10). For example, the laser height sensor module 112 may be configured to send control signals to multiple robotic manipulators 88 or other mechanical motion systems to prevent collision of the induction heating coil 36 with the surface of the part being heated (e.g., the workpiece 32), and to maintain a constant stand-off distance of the induction heating coil 36 from the surface of the part being heated (e.g., the workpiece 32).

In addition, in certain embodiments, the hybrid induction heating/welding assembly 90 may include an infrared temperature sensor module 114 (e.g., disposed within a housing of the hybrid induction heating/welding assembly 90) that includes one or more infrared temperature sensors, and is configured to determine how to control operation of the hybrid induction heating/welding assembly 90 accordingly. For example, the infrared temperature sensor module 114 may include its own control circuitry (e.g., one or more processors configured to execute code stored in one or more storage media, similar to the control circuitry 54, 62 described herein) for determining temperatures proximate the induction heating coil 36 and/or the surface of the part being heated (e.g., the workpiece 32), and for at least partially controlling operation of the hybrid induction heating/welding assembly 90 accordingly (e.g., either individually controlling or providing coordinated control with the control circuitry 54, 62 of the welding power supply 12 and the induction power supply 38, respectively, or some other control circuitry of the system 10). For example, the infrared temperature sensor module 114 may be configured to send control signals to the control circuitry 54 of the welding power supply 12 and/or the control circuitry 62 of the induction power supply 38 to adjust the welding and/or induction power supplied to the hybrid induction heating/welding assembly 90 by the welding power supply 12 and/or the induction power supply 38, to send control signals to control position, orientation, and/or movement of the hybrid induction heating/welding assembly 90 relative to the surface of the part being heated (e.g., the workpiece 32), to adjust flow rates and/or temperatures of air and/or coolant delivered by the hybrid induction heating/welding assembly 90 to the surface of the part being heated (e.g., the workpiece 32), and so forth.

In addition, in certain embodiments, the hybrid induction heating/welding assembly 90 may include a compressed air manifold 116 configured to deliver compressed air to the surface of the part being heated (e.g., the workpiece 32). For example, in certain embodiments, one or more air valves 118 may be controlled such that flow rates of one or more air flow streams (e.g., the air 100 guided by the frustoconical air knife 92 illustrated in FIG. 8) delivered to the surface of the part being heated (e.g., the workpiece 32) may be controlled.

In addition, in certain embodiments, the hybrid induction heating/welding assembly 90 may include one or more air flow sensors 120 configured to detect flow rates of the air flow streams (e.g., the air 100 guided by the frustoconical air knife 92 illustrated in FIG. 8) delivered to the surface of the part being heated (e.g., the workpiece 32). The one or more air flow sensors 120 may be communicatively coupled to control circuitry (e.g., the control circuitry 54, 62 of the welding power supply 12 and the induction power supply 38, respectively, or some other control circuitry of the system 10), and the control circuitry 54, 62 may receive a signal from the one or more air flow sensors 120, and determine how to control operation of the hybrid induction heating/welding assembly 90 accordingly, for example, by manipulating the one or more air flow valves 118 to adjust flow rates of the air flow streams delivered to the surface of the part being heated (e.g., the workpiece 32).

In addition, in certain embodiments, the hybrid induction heating/welding assembly 90 may include a water manifold 122 configured to deliver water (or other coolant) to the surface of the part being heated (e.g., the workpiece 32), for example, through the spray head 94. In addition, in certain embodiments, the hybrid induction heating/welding assembly 90 may include one or more water flow sensors 124 and/or one or more water temperature sensors 126 configured to detect flow rates and/or temperatures, respectively, of the water flow streams (e.g., the water spray 96, 98 illustrated in FIG. 8) delivered to the surface of the part being heated (e.g., the workpiece 32). The one or more water flow sensors 124 and/or one or more water temperature sensors 126 may be communicatively coupled to control circuitry (e.g., the control circuitry 54, 62 of the welding power supply 12 and the induction power supply 38, respectively, or some other control circuitry of the system 10), and the control circuitry 54, 62 may receive signals from the one or more water flow sensors 124 and/or the one or more water temperature sensors 126, and determine how to control operation of the hybrid induction heating/welding assembly 90 accordingly, for example, by adjusting flow rates and/or temperatures of the water flow streams delivered to the surface of the part being heated (e.g., the workpiece 32).

As described herein, in certain embodiments, all of the components illustrated in FIGS. 7A and 7B may be disposed within a single housing of the hybrid induction heating/welding assembly 90. To that end, as illustrated in FIG. 7A, in certain embodiments, the hybrid induction heating/welding assembly 90 may include composite mounts 128 for mounting the transformer 42 to a mounting bracket 130 of the hybrid induction heating/welding assembly 90. Various brackets 132 provide support for many of the other components of the hybrid induction heating/welding assembly 90 and, as illustrated in FIG. 7B, provide a support structure for the housing 134 of the hybrid induction heating/welding assembly 90, within which the welding torch 16 and the one or more induction heating coil(s) 36 (as well as the other internal components illustrated in FIGS. 4-8) may be at least partially enclosed.

Figure 9:
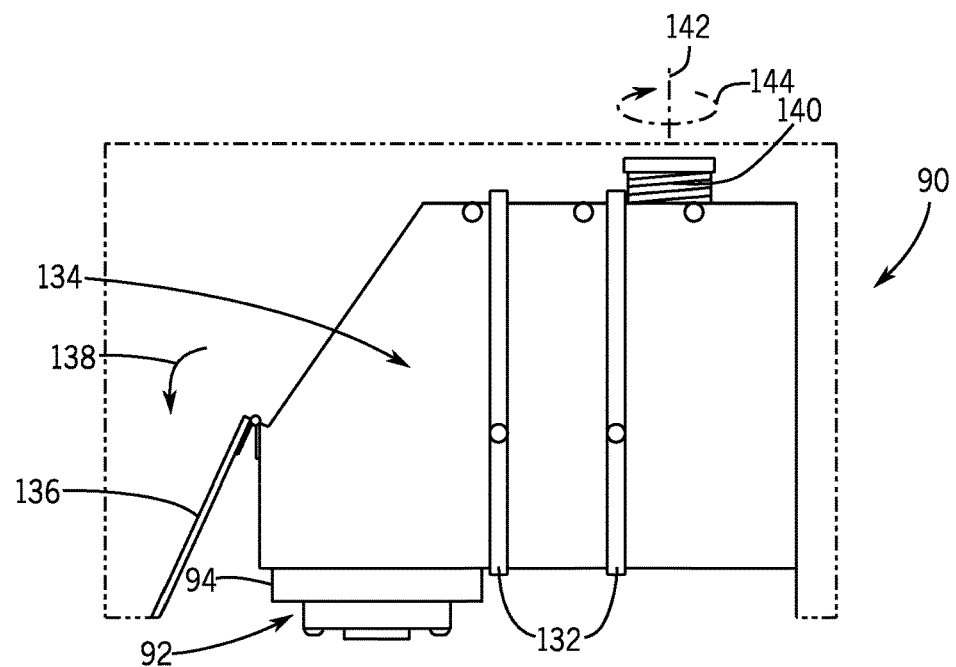
FIG. 9 is a side view of an embodiment of a protective housing of the hybrid induction heating/welding assembly, in accordance with aspects of the present disclosure.

FIG. 9 is a side view of the protective housing 134 of the hybrid induction heating/welding assembly 90. The protective housing 134 may be comprised of many different protective materials including, but not limited to, high density polypropylene, ceramic, plexiglass, or other protective materials. In addition, in certain embodiments, the hybrid induction heating/welding assembly 90 may include an access cover 136 configured to facilitate access to the internal components of the hybrid induction heating/welding assembly 90 (which are illustrated in FIGS. 7A and 7B). For example, in the illustrated embodiment, the access cover 136 is configured to swing open, as illustrated by arrow 138.

Figure 10:
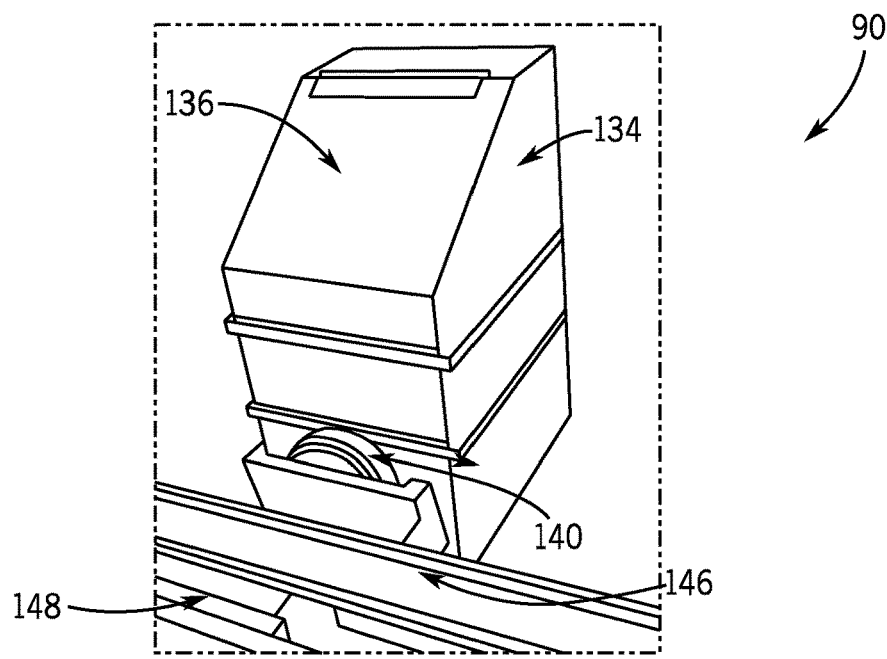
FIG. 10 is a perspective view of the hybrid induction heating/welding assembly of FIG. 9 coupled to mechanical motion systems, in accordance with aspects of the present disclosure.

As also illustrated in FIG. 9, in certain embodiments, the hybrid induction heating/welding assembly 90 may also include a motorized mount 140 disposed externally from the protective housing 134. In certain embodiments, the motorized mount 140 facilitates 360° of rotation of the hybrid induction heating/welding assembly 90 (e.g., around an axis 142, as illustrated by arrow 144). For example, the motorized mount 140 may include a motor configured to cause rotation that facilitates the rotation of the hybrid induction heating/welding assembly 90. In addition, the motorized mount 140 of the hybrid induction heating/welding assembly 90 facilitates coupling of the hybrid induction heating/welding assembly 90 to the multiple robotic manipulators 88 or other mechanical motion systems described herein (see, e.g., FIG. 2). For example, FIG. 10 is a perspective view of the hybrid induction heating/welding assembly 90 coupled to mechanical motion systems 146, 148. In certain embodiments, a first mechanical motion system 146 may facilitate x- and y-axis linear motion of the motorized mount 140 of the hybrid induction heating/welding assembly 90, whereas a second mechanical motion system 148 may facilitate z-axis motorized motion of the motorized mount 140 of the hybrid induction heating/welding assembly 90.

Returning now to FIG. 6, although described as being a welding torch 16 being used for a hybrid induction arc welding process, in other embodiments, the welding torch 16 may instead be replaced by a plasma cutting torch being used for a hybrid induction cutting process, or other hybrid metal working and induction heating processes may be implemented using other types of metal working tools. Indeed, in certain embodiments, the welding torch 16 (and plasma cutting torches, etc.) may be removable and replaceable from the hybrid induction heating/welding assembly 90 (i.e., leaving the rest of the internal components of the hybrid induction heating/welding assembly 90 unchanged) such that different hybrid induction heating processes may be implemented by the hybrid induction heating/welding assembly 90 with relatively minimal effort.

Figure 11A:
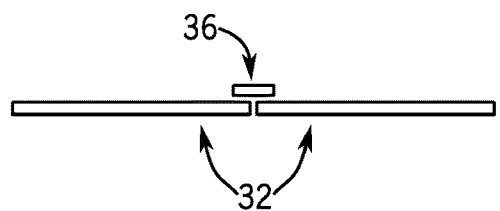
FIGS. 11A and 11B illustrate two induction heating coil configurations for butt joints, in accordance with aspects of the present disclosure.
Figure 11B:
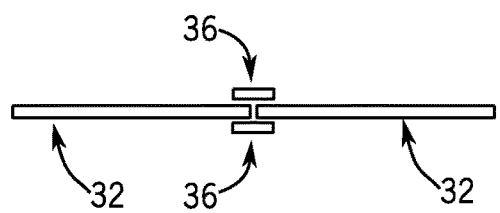
Figure 12A:
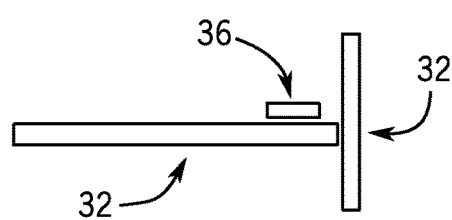
FIGS. 12A through 12H illustrate various induction heating coil configurations for T-fillet joints, in accordance with aspects of the present disclosure.
Figure 12B:
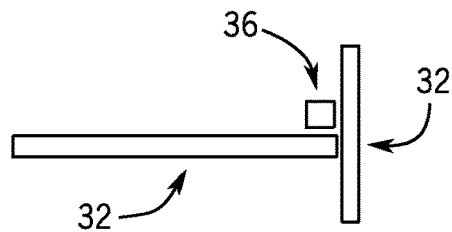
Figure 12C:
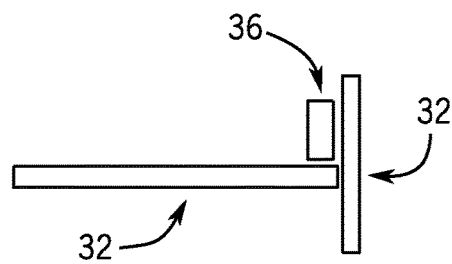
Figure 12D:
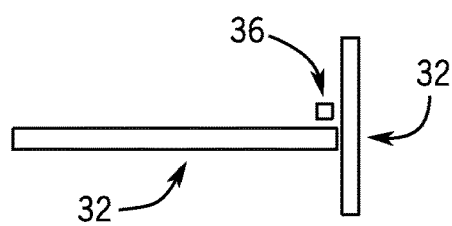
Figure 12E:
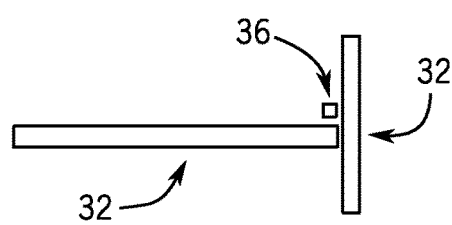
Figure 12F:
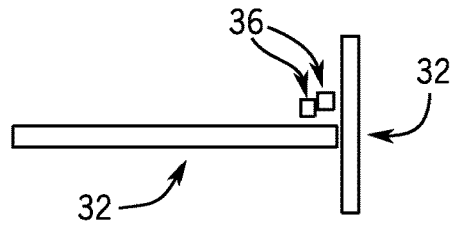
Figure 12G:
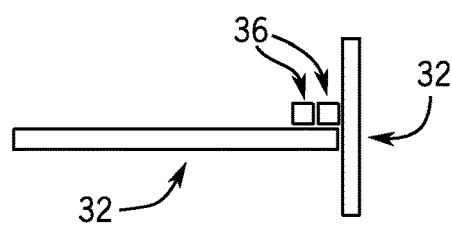
Figure 12H:
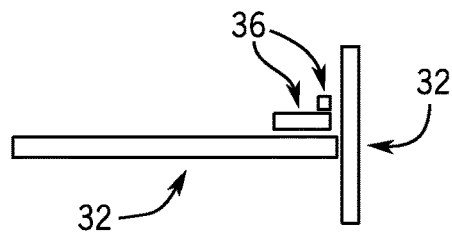

In addition to having removable and replaceable welding torches 16 and/or plasma cutting torches, etc., in certain embodiments, the induction heating coil 36 of the hybrid induction heating/welding assembly 90 may also be removable and replaceable. Indeed, in certain embodiments, multiple induction heating coils 36 may be installed into the hybrid induction heating/welding assembly 90 to facilitate different configurations of parts (e.g., workpieces 32) being welded, cut, formed, etc. For example, FIGS. 11A and 11B illustrate two induction heating coil 36 configurations for butt joints. As illustrated in FIG. 11A, in certain embodiments, a single induction heating coil 36 may be disposed on a first side of parts (e.g., workpieces 32) being welded. In other embodiments, a first induction heating coil 36 may be disposed on a first side of parts (e.g., workpieces 32) being welded, whereas a second (e.g., back side) induction heating coil 36 may be disposed on a second, opposite side (e.g., back side) of the parts (e.g., workpieces 32) being welded. FIGS. 12A through 12H illustrate various induction heating coil 36 configurations for T-fillet joints.

Figure 13A:
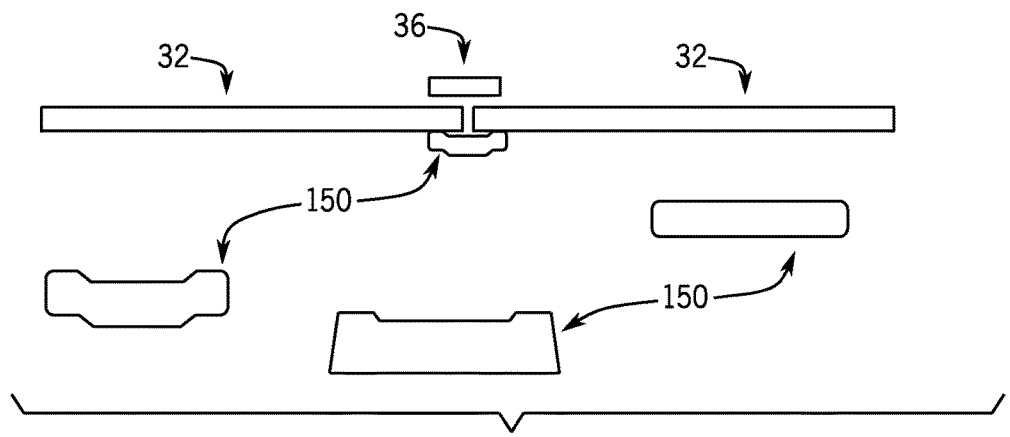
FIGS. 13A and 13B illustrate various shapes of a weld backing for use in butt joints and T-fillet joints, respectively, in accordance with aspects of the present disclosure.
Figure 13B:
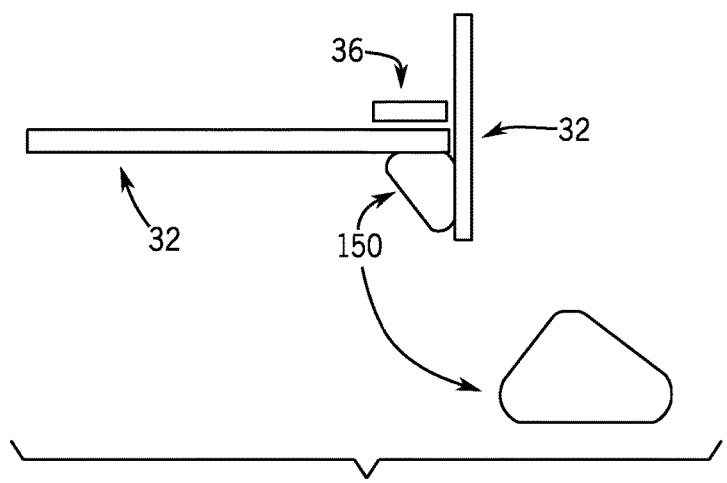

In certain embodiments, a weld backing 150 may be used in conjunction with the hybrid induction heating/welding assembly 90. More specifically, as illustrated in FIG. 13A, in the context of butt joints, the weld backing 150 may be disposed on a side of the parts (e.g., workpieces 32) being welded opposite from an induction heating coil 36 of the hybrid induction heating/welding assembly 90. FIG. 13A also illustrates various shapes of the weld backing 150 for use in butt joints. Similarly, as illustrated in FIG. 13B, in the context of T-fillet joints, the weld backing 150 may be disposed on a side of one of the parts (e.g., workpieces 32) being welded opposite from an induction heating coil 36 of the hybrid induction heating/welding assembly 90. FIG. 13B also illustrates an exemplary shape of the weld backing 150 for use in T-fillet joints. The weld backings 150 illustrated in FIGS. 13A and 13B may be made of a variety of materials including, but not limited to, copper, water-cooled copper, ceramic, powdered flux, fiberglass, woven fiber glass cloth, and so forth.

Figure 14A:
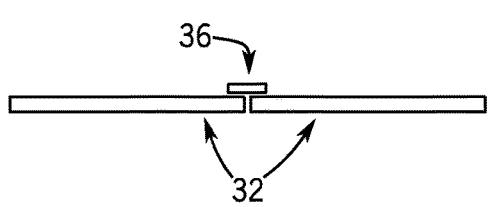
FIGS. 14A and 14B illustrate a coil standoff distance between the induction heating coil(s) of the hybrid induction heating/welding assembly and the surface of workpieces, in accordance with aspects of the present disclosure.
Figure 14B:
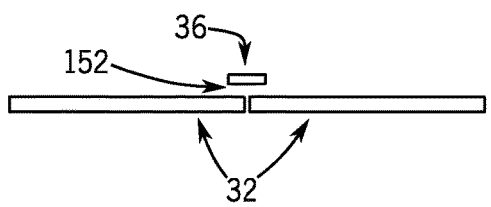
Figure 15A:
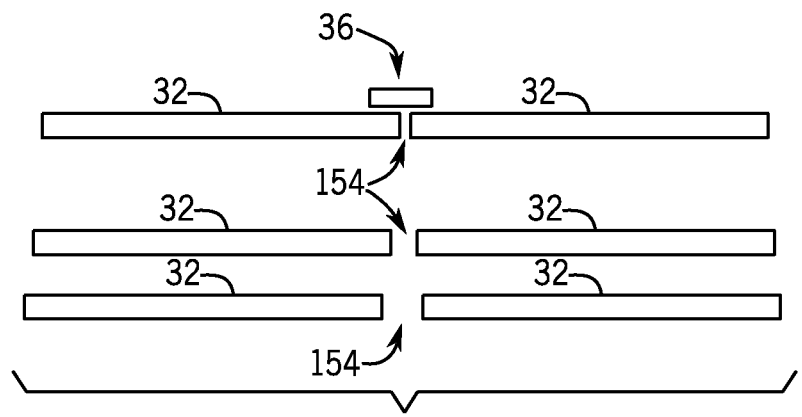
FIGS. 15A and 15B illustrate various weld gap distances between workpieces for butt joints and T-fillet joints, respectively, in accordance with aspects of the present disclosure.
Figure 15B:
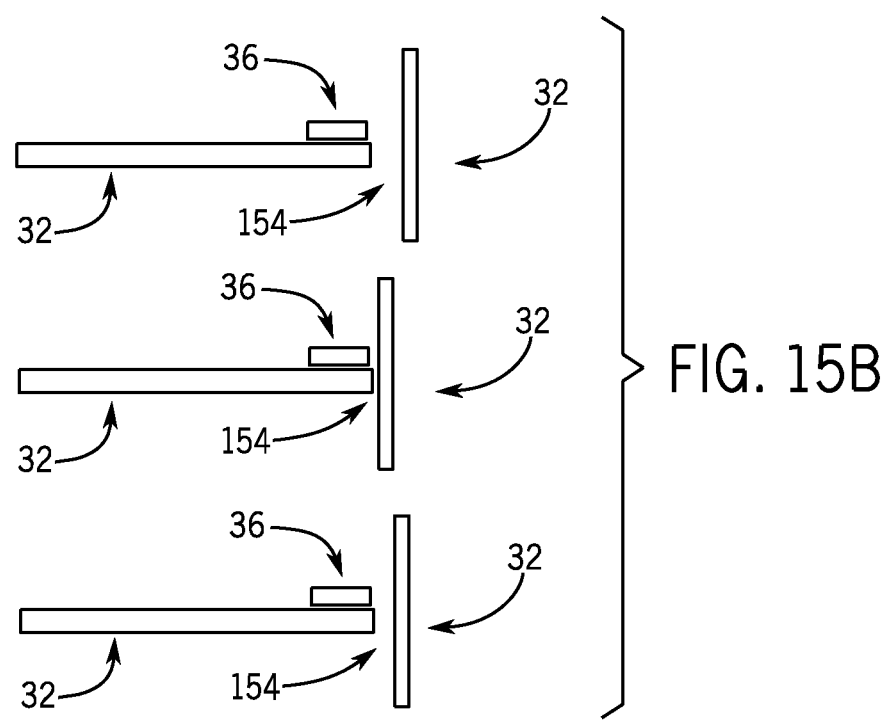

As described herein, the hybrid induction heating/welding assembly 90 may include various sensors and/or sensor modules configured to detect operational parameters of the hybrid induction heating/welding assembly 90 (e.g., position, orientation, and/or movement of the induction heating coil(s) 36 of the hybrid induction heating/welding assembly 90 relative to a surface of the workpiece(s) 32, air and/or coolant flow rates and/or temperatures, welding power, induction heating power, and so forth), and to send signals to control circuitry (e.g., the control circuitry 54, 62 of the welding power supply 12 and the induction power supply 38, respectively, or some other control circuitry of the system 10) for the purpose of adjusting the operational parameters. For example, as illustrated in FIGS. 14A and 14B, in certain embodiments, the distance 152 between the induction heating coil(s) 36 of the hybrid induction heating/welding assembly 90 and the surface of the workpieces 32 (referred to as the "coil standoff distance") may be continually adjusted, for example, by the one or more robotic manipulators 88 or other mechanical motion systems described herein (see, e.g., FIG. 2) based at least in part on feedback from the various sensors and/or sensor modules of the hybrid induction heating/welding assembly 90. In addition, as illustrated in FIGS. 15A and 15B, in certain embodiments, the distance 154 between workpieces 32 (referred to as "weld gap distance") may be continually adjusted, for example, by the one or more robotic manipulators 88 or other mechanical motion systems described herein (see, e.g., FIG. 2) based at least in part on feedback from the various sensors and/or sensor modules of the hybrid induction heating/welding assembly 90.

The hybrid induction metal working processes described herein precisely place the added heat, speed up the process so that, for example, the weld and base metal do not have added heat per unit length of weld, and place the heat where it reduces the distortion and distortion-related problems. By utilizing the induction heat to raise the surfaces of the weld joint up to a higher temperature, or even near melting, the heat of the welding arc can be utilized to melt the wire, and the process can run at much higher travel speed than conventional welding. The arc can be mostly contained in a narrow weld joint gap, thus much less of the arc energy is lost to the surrounding environment, resulting in much more efficient use of the energy in the arc plasma. Welding defects, which require labor and materials, as well as schedule time, are reduced, thus resulting in higher overall productivity. Moreover, when using conventional welding techniques, narrow gap welding is a problem using only the welding arc for heat—gaps need to be fairly wide, and generally need to be wider at the top to accommodate the welding arc. With the improved hybrid induction metal working processes described herein, a much narrower gap can be used, because the arc can easily melt into the weld edges, which are already closer to the melting point, rather than having to machine or grind the weld joint to open the top.

Productivity is also increased because the narrow gap results in a reduced use of consumables. The volume of metal needed to fill the weld joint gap is supplied by the melted welding wire. A narrower gap will, necessarily, reduce the welding wire consumption—essentially replacing what, using conventional welding gaps, would have been expensive welding wire with the much less expensive base metal of the parts (e.g., the workpieces 32) being joined. A narrow gap reduces the amount of shielding gas or flux as well. Consequently, productivity, which may be expressed as a measure of the ratio of length of weld produced per unit cost, is increased. Additionally, the wear and damage to the welding torch 16, particularly the replacement parts, is generally measured by the total "arc-on" time. The added speed of the process, reduces the amount of time the arc is on, thus reducing the wear and damage to the welding torch 16, as well as the wire feeder. This is also true of the use of energy—as an energy radiator, the arc plasma losses to the surrounding environment can be 30-50 percent. Induction heating is generally 8 percent or less energy lost—resulting in additional improvement in productivity.

As used herein, the term narrow gap is intended to encompass gaps characterized by relatively similar widths between the workpieces 32 at the top and bottom of the workpieces 32, respectively. For example, in certain embodiments, the width between the workpieces 32 at the top of the workpieces 32 may only be approximately 10-75% larger than the width between the workpieces 32 at the bottom of the workpieces 32, which may lead to a relatively low angle of the narrow gap of approximately 10°-approximately 25°, approximately 1°-approximately 10°, approximately 0°-approximately 5°, approximately 0°-approximately 2.5°, or even lower. Indeed, in certain embodiments, the width between the workpieces 32 at the top of the workpieces 32 may be substantially similar (e.g., within 0-5%) to the width between the workpieces 32 at the bottom of the workpieces 32, which may lead to an angle of the narrow gap of approximately 0° (e.g., less than approximately 1°, less than approximately 0.5°, and so forth). It will be appreciated that other, less narrow, angles (e.g., approximately 35°-approximately 45°) may also benefit from the embodiments described herein.

Figure 16:
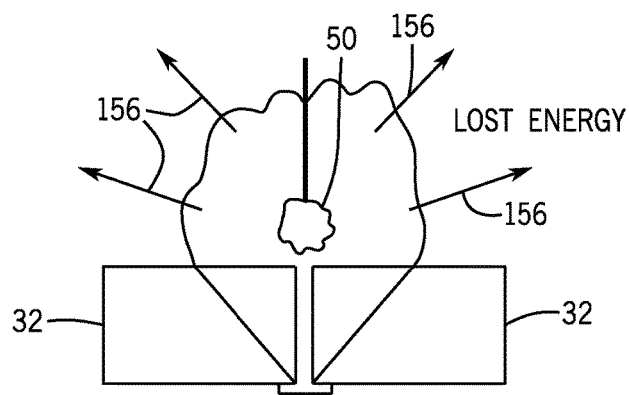
FIG. 16 illustrates a conventional welding operation in which a V-joint profile is used, with the consequent loss of energy from the welding arc.

Because of various constraints on the welding arc available energy level, weld joints, particularly in joining thicker metal, are cut, ground, or machined to have a profile larger at the surface closest to the welding arc. Industry statistics show that more time, perhaps as much as double, is needed to set-up a cutting machine to produce such a beveled weld joint profile or a V-joint profile. FIG. 16 illustrates a conventional welding operation in which a V-joint profile is used, with the consequent loss of energy 156 from the welding arc 50. Even more time and cost is spent creating other types of weld joint profiles, such as J-grooves or U-grooves, with similar consequent energy loss.

Figure 17:
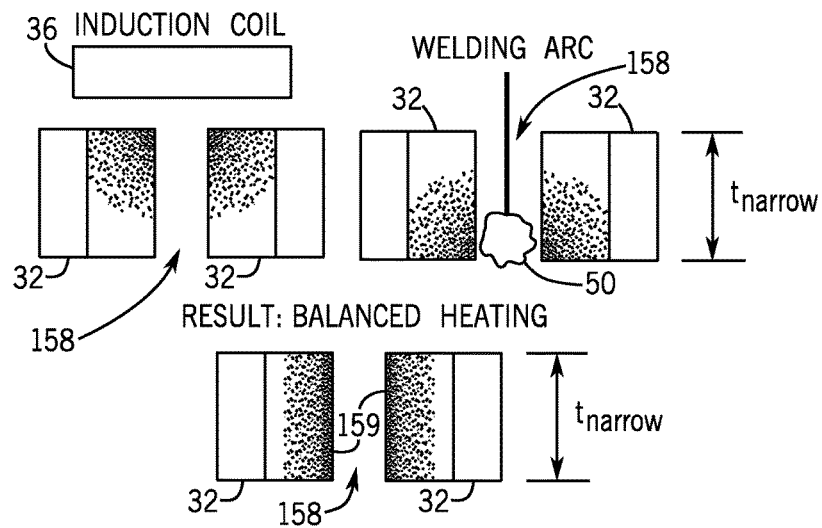
FIG. 17 illustrates how the application of induction heating and arc heating may be combined for balanced heating in a narrow gap weld, in accordance with aspects of the present disclosure.

FIG. 17 illustrates a welding process (a GMAW welding process, for example) in which a generally straight narrow gap 158 is provided between workpieces 32 to be joined. In particular, in the illustrated embodiment, the inner (e.g., mutually facing) surfaces 159 of the narrow gap 158 may be substantially parallel to each other (e.g., within 5°, within 2°, within 1°, or even less). An induction heating coil 36 is utilized to heat the workpieces 32. The heat profile of the welding arc 50 is generally balanced with the induction heat profile to provide a more balanced heating profile in the narrow gap 158. More specifically, as illustrated in FIG. 17, due to the positioning of induction heating coil 36 and the welding torch 16 with respect to the workpieces 32 (which, again, may be actively controlled by the control circuitry described herein), the combination of the induction heating profile generated by the induction heating coil 36 and the welding arc heating profile generated by the welding torch 16 may be balanced (e.g., substantially evenly distributed) throughout the entire thickness $t_{narrow}$ of the straight narrow gap 158 formed between the workpieces 32. For example, in certain embodiments, the heat generated on the inner surfaces 159 of the workpieces 32 may vary by less than 15%, less than 10%, less than 5%, less than 2%, and so forth, along the inner surfaces 159. Welds have been produced with the hybrid induction welding processes described herein of zero width square butt weld joint gap. The process has been shown to make acceptable welds with a gap 158 as large as 0.125". It appears feasible to produce welds with gaps 158 as large as 0.375" or larger, however, the primary benefit in productivity is gained from as narrow of a gap 158 as possible (e.g., less than approximately 0.375", less than approximately 0.125", and so forth).

It will be appreciated that the balancing between the heat profile generated by the welding arc 50 and the induction heat profile generated by the induction heating coil 36 may be actively controlled by the control circuitry 54 of the welding power supply 12, the control circuitry 62 of the induction power supply 38, or some other control circuitry of the system 10. For example, the control circuitry 54 of the welding power supply 12, the control circuitry 62 of the induction power supply 38, or some other control circuitry of the system 10, may receive signals relating to detected operational parameters of the hybrid induction heating/welding assembly 90 from the various sensors and/or sensor modules described herein, and may determine (e.g., estimate) the heat profile generated by the welding arc 50 and/or the induction heat profile generated by the induction heating coil 36, then determine a combined heat profile (e.g., a combination of the estimated heat profile generated by the welding arc 50 and the estimated induction heat profile generated by the induction heating coil 36), and adjust certain operational parameters to balance the heat profile generated by the welding arc 50 and the induction heat profile generated by the induction heating coil 36 to, for example, minimize distortion and stresses in the workpieces 32. For example, in certain embodiments, the positioning of the welding torch and/or the induction heating coil(s) 36 relative to the workpieces 32 may be continually adjusted, for example, by the one or more robotic manipulators 88 or other mechanical motion systems described herein (see, e.g., FIG. 2) based at least in part on algorithms executed by the control circuitry 54 of the welding power supply 12, the control circuitry 62 of the induction power supply 38, or some other control circuitry of the system 10, to determine (e.g., estimate) the heat profile generated by the welding arc 50 and/or the induction heat profile generated by the induction heating coil 36 based at least in part on the feedback from the various sensors and/or sensor modules of the hybrid induction heating/welding assembly 90, and then determine the combined heat profile (e.g., a combination of the estimated heat profile generated by the welding arc 50 and the estimated induction heat profile generated by the induction heating coil 36).

Side wall fusion defects are common in narrow gap welding with conventional arc welding processes. Defect repairs are costly in materials and labor as well as causing production scheduling delays and, thus, are a significant detriment to productivity. Because of the balanced heating generated by the combination of an independently controlled induction heating coil(s) 36 and an arc plasma (e.g., generated by the welding torch 16), sidewall fusion defects are reduced or eliminated.

Although the use of a single induction heating coil 36 may be the simplest application of the hybrid induction welding processes described herein, multiple induction heating coils 36 may be used to further increase productivity. In particular, in certain embodiments, a single wide induction heating coil 36 can span the weld joint gap, simultaneously heating both sides (see, e.g., FIG. 18A). Conversely, in other embodiments, dual parallel induction heating coils 36 on both sides of the weld joint gap can be used to double the induction heating and, with an increase in the welding arc wire feed speed and power level, to double the welding speed or more than double the welding speed (see, e.g., FIG. 18B).

Figure 19A:
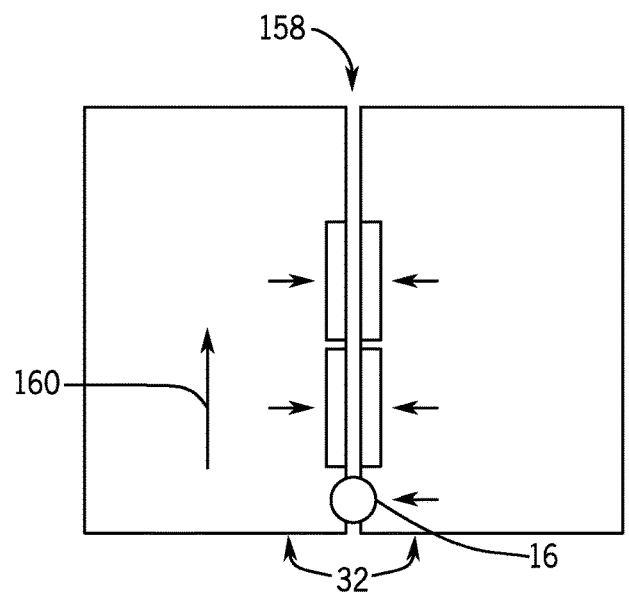
FIGS. 19A and 19B illustrates various configurations for multiple induction heating coils, in accordance with aspects of the present disclosure.
Figure 19B:
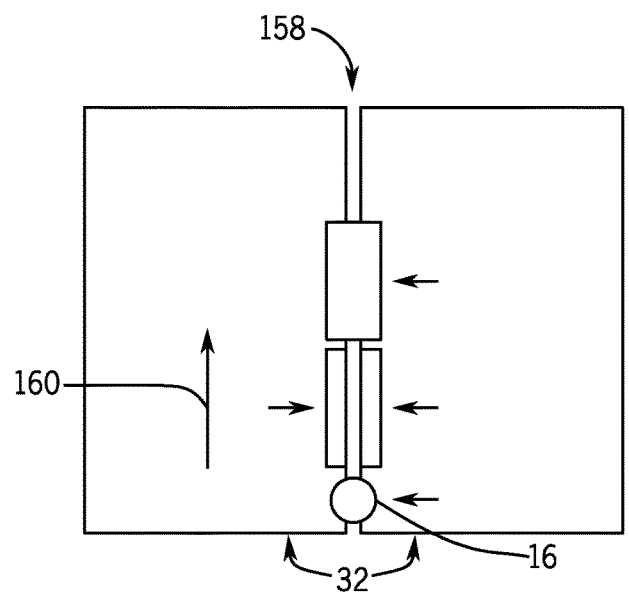

Multiple induction heating coils 36 can also be used in series in certain embodiments. For example, two relatively wide induction heating coils 36, one in front of the other ahead of the welding torch 16 along the weld seam may be used to double the induction power. In addition, as illustrated in FIG. 19A, in certain embodiments, multiple sets of parallel induction heating coils 36 may be used in series to quadruple the induction heating power. Furthermore, as illustrated in FIG. 19B, in other embodiments, other combinations of induction heating coils 36, such as two parallel induction heating coils 36 placed in series with a single wide induction heating coil 36 further ahead in the direction of welding 160 (e.g., further in front of the welding torch 16) may be used.

Multiple orientations are possible including placing the induction heating coil(s) 36 on the back side of the weld, or positioned to favor the direction for desired penetration, or positioned as dictated by access limitations. The finished weld profile (cross-section) shows that the melted material favors the area with induction heating. Therefore, positioning of the induction heating coil(s) 36 relative to the joint adds another level of control to influence the penetration profile of a finished weld or the preferred direction of a cutting process. For example, in the case of joining a thicker member to a thinner member, induction heating may be used to ensure adequate penetration on the thick member without excessive heat on the thinner member. This process may allow for joints that were too difficult in the past using conventional processes. Further, weld penetration will favor where the material is already heated. Thus, by strategically placing the induction heating, the finished weld penetration location, depth, width, or other critical cross-section metrics may be optimized.

There are no restrictions of the type of weld shielding gases that may be used for hybrid induction arc processes which are gas shielded. All of the standard weld shielding gasses should be capable of providing shielding for the hybrid induction arc welding processes described herein. The process provides an opportunity to create new gas mixtures that enhance hybrid induction arc welding, but which may not be suitable for conventional arc welding processes. For example, a welding gas containing a mixture of argon and helium in higher proportions of helium could be used, to enhance the arc characteristics. In an ordinary welding process with a weld joint gap that is wider at the top, gas mixtures that contain higher percentages of low-density gases will tend to separate and the low-density gas can easily escape through the wide gap opening. For example, in an argon/helium mixture, the argon would tend to concentrate in the bottom of the weld joint and the helium at the top of the weld joint. For conventional GMAW processes, the highest level of helium in a shielding gas is 75 percent, however, for the hybrid induction heating processes described herein, a shielding gas with 75 to 95 percent helium would provide a hotter arc with excellent sidewall wetting to prevent defects from forming. Helium is more expensive than argon, but the very narrow weld joint gap constrains the width of the volume of gas needed, and the use of a lower cost leading gas and trailing gas will constrain the shielding gas to a small volume, thereby reducing the cost and increasing the productivity as a measure of cost per unit length of weld. Other welding gas mixtures can be used with the hybrid induction arc welding processes described herein, which would generally not be used for conventional gas shielded welding processes. For example, a gas mixture of approximately 17% argon (e.g., in a range of approximately 15-20% argon) and approximately 83% helium (e.g., in a range of approximately 80-85% helium) could be used for the hybrid induction arc welding (or cutting) processes described herein.

The hybrid induction arc welding (or cutting) processes described herein may utilize a travel speed that is faster than regular metal fabrication processes. Therefore, conventional gas delivery mechanisms may not be adequate. For example, conventional processes primarily use one gas flow nozzle (e.g., for delivery of the shielding gas from the gas source 22). In contrast, the system 10 described herein may require leading, main, and trailing gas nozzles. With the additional delivery locations, the gas combustion at each location may be optimized for a particular purpose such as heat, surface tension, purging the area of nitrogen, stirring action, process dynamics, and so forth.

Figure 20:
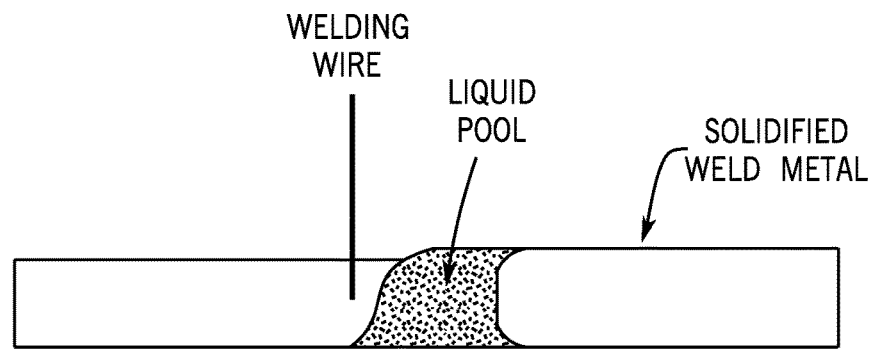
FIG. 20 illustrates a narrow gap weld being performed using the hybrid induction arc welding processes in accordance with aspects of the present disclosure.

In a conventional gas shielded arc welding process, once the welding arc has been completed, the plasma terminates into a liquid metal pool. Conversely, with the hybrid induction arc welding processes described herein, the narrow gap 158 is completely filled with the arc 50 such that arc forces keep the liquid metal out of that area of the weld joint gap, essentially creating a dam which holds back a "river" of liquid metal, as illustrated in FIG. 20. As the welding torch 16 moves along the joint, the liquid metal fills in behind the welding arc 50. In order to obtain good sidewall fusion, it is important that a thin film of liquid metal remain coating the weld joint gap sides. Consequently, a shielding gas component which, when in contact with the liquid metal, reduces the surface energy of the liquid metal pool, will tend to promote the uniform coating of the surface of the weld joint gap with liquid metal. This is because if a gap occurs in the liquid metal coating, it will create a higher energy surface, so the liquid metal will stretch to maintain coverage of the solid metal surface. The tendency to minimize surface energy is a defining factor in the morphology and composition of surfaces and interfaces. In general, wetting of a surface by a liquid is promoted if the liquid surface energy with the surrounding environment is lower than that of the solid metal surface. A gas mixture containing a gas which lowers the surface energy of the liquid will, thus, promote the coating of the metal surface with liquid metal. For example, the presence of only 50 ppm sulfur in liquid iron will reduce the surface tension by approximately 20%. Sulfur hexafluoride is a relatively dense gas that is nonreactive and nontoxic, and used as a propellant for aerosol delivery of liquid products. Therefore, a gas mixture of approximately 17% argon (e.g., in a range of approximately 15-20% argon), approximately 82.5% helium (e.g., in a range of approximately 80-85% helium), and approximately 0.5% sulfur hexafluoride (e.g., in a range of approximately 0.1-1.0% sulfur hexafluoride), for example, could be used to promote the wetting of the sides of the weld joint gap, and prevent sidewall fusion defects.

There are no restrictions of the type of welding wire that can be used with the hybrid induction arc welding processes described herein. However, powdered metal core wires tend to produce a welding arc 50 with a more uniform diameter, which will provide even more heat distribution from the arc plasma. Since the hybrid induction arc welding processes described herein do not require as much energy from the arc 50 to heat the base material (e.g., the workpiece(s) 32), the wire may be optimized to apply more of the energy to melt the wire. For example, solid wire that is more resistive, or a metal core wire whose outer sheath is more resistive (by thickness or alloy) may be used such that the wire is more easily melted.

Welding processes that increase the heat on the wire versus the base material can be used to increase the melting rate. Processes such as electrode negative (e.g., DCEN) welding, extended electrode stickout, and AC welding processes may be used to put more heat on the wire. In general, processes that would otherwise have poor penetration may now be used with the hybrid induction arc welding processes described herein.

Certain exemplary wire/gas compositions that have been shown to produce high quality welds at maximum speeds with the hybrid induction arc welding processes described herein include, for example: (1) using an iron alloy wire with a composition shown in Table 1 below, and using an approximately 17% argon/approximately 83% helium gas mixture, (2) using an iron alloy wire with the composition shown in Table 1 below, and using an approximately 17% argon/approximately 82.5% helium/approximately 0.5% sulfur hexafluoride gas mixture, and (3) using an iron alloy wire with the composition shown in Table 1 below, and using an approximately 10% carbon dioxide/approximately 90% argon gas mixture.

TABLE 1

Weld Metal Analysis

| | |
|---|---|
| Carbon (C) | 0.03 |
| Manganese (Mn) | 1.57 |
| Silicon (Si) | 0.69 |
| Phosphorus (P) | 0.001 |
| Sulphur (S) | 0.006 |

Figure 21:
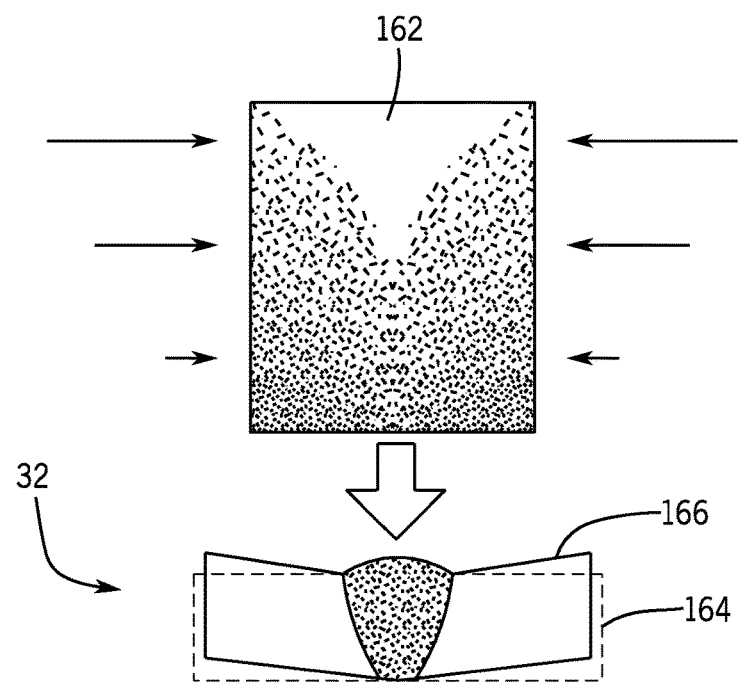
FIG. 21 illustrates a non-uniform heat profile that may be generated by a conventional butt welding arc, and the distortion of a workpiece from its original shape to a distorted shape.

Weld distortion is caused when the heat in a weld is not uniformly distributed. When the metal cools, it contracts, proportionately to the temperature of the metal (see FIG. 16). For arc welding, the electric arc radiates thermal energy. The portions of the weld which are closer to the arc receive more heat than the metal on the opposite side of the weld from the arc. As the weld cools, the hotter regions shrink more than the cooler regions. This causes non-uniform thermal stresses to develop in the weld. Non-uniform thermal stresses cause the metal to distort from the original size of the part before the welding process occurred. FIG. 21 illustrates the non-uniform heat profile 162 that may be generated by a conventional welding arc, and the distortion of a workpiece from its original shape 164 to a distorted shape 166.

Figure 22:
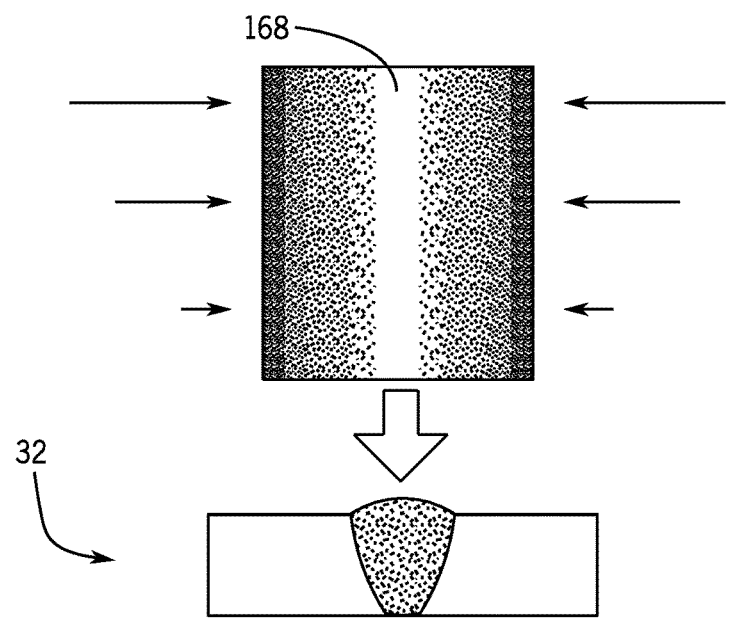
FIG. 22 illustrates a uniform heat profile that may be generated in a butt weld using the hybrid induction arc welding processes in accordance with aspects of the present disclosure.

The hybrid induction arc welding process described herein utilizes two independent heat sources (e.g., the heat profile generated by the welding arc 50 and the induction heat profile generated by the induction heating coil 36), to balance the heat distribution in the weld. The resulting thermal profile, with uniform heating, provides a weld which shrinks uniformly and does not generate non-uniform thermal stresses. At least one high-frequency induction coil 36 is placed near the welding torch 16. The induction coil 36 heats the top of the weld up to near the melting point of the workpiece(s) 32 (e.g., greater than 50% homologous temperature). As used in the present disclosure, the "homologous temperature" of a material refers to the ratio of the actual temperature of the material to the melting temperature of the material, both expressed in absolute temperature terms (e.g., degrees Kelvin). Then, following the induction coil 36, the arc welding process is applied by the welding torch 16 in such a way that the bottom of the weld is heated (see, e.g., FIG. 17). The resulting thermal profile is uniform heating through the weld. The weld then does not develop non-uniform thermal stresses, and the weld shrinkage is uniform through the weld. The uniform thermal stresses do not distort the weld (contrast the uniform heat profile 168 of FIG. 22 with the non-uniform heat profile 162 of FIG. 21).

Figure 23:
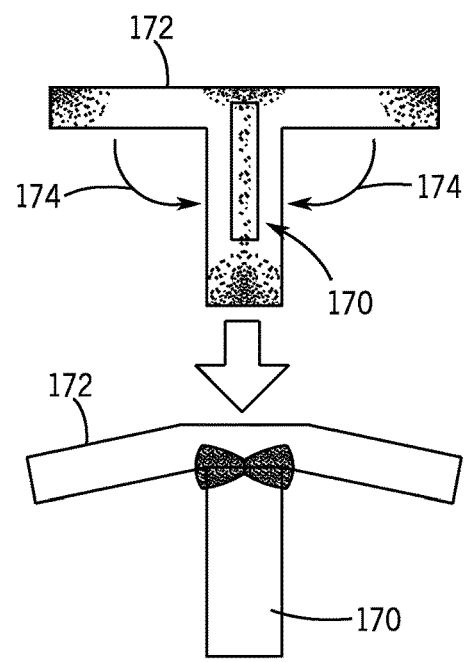
FIG. 23 illustrates a heat profile that may be generated by a conventional T-fillet welding arc, and the distortion of a workpiece from its original shape to a distorted shape.

Similar heat patterns can be developed to prevent distortion from occurring in other weld joint designs. For example, for T-fillet joints the distortion mechanism is different than for butt joints. In a T-fillet joint, the arc plasma of the welds heats the surface of the discontinuous member, but the center column of metal is still cool. The result is that the cool center column in the bottom member 170 remains relatively fixed, while the heated metal of the surfaces of the top member 172 and the weld metal itself cools and shrinks. This causes the top member 172 to bend toward the weld, as illustrated by arrows 174 (see FIG. 23).

Figure 24:
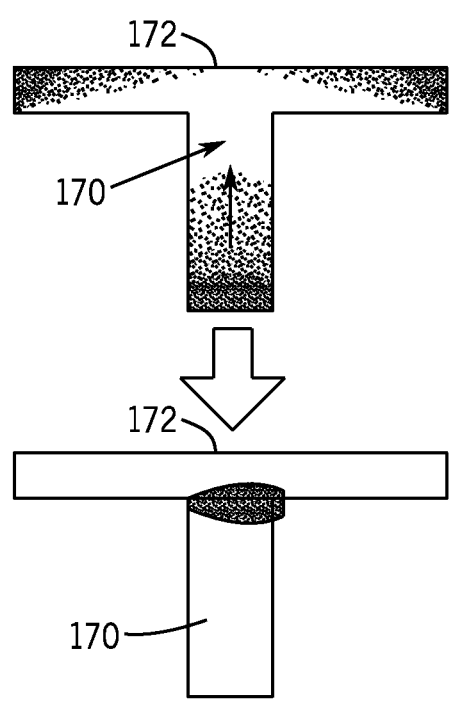
FIG. 24 illustrates a heat profile that may be generated in a T-fillet weld using the hybrid induction arc welding processes in accordance with aspects of the present disclosure.

By heating the surface of the weld to nearly the melting point, the arc then provides sufficient heat to heat the entire thickness of the top member 172, thus eliminating the cool column of metal in the center of the bottom member 170. When the weld cools, the top member 172 is pulled toward the bottom member 170 by the thermal contraction of the center of the top member 172. The shrinking weld deposit shrinks with the top member 172 and does not apply any stress load to the bottom member 170, thus eliminating the weld distortion (see FIG. 24). As described herein, the reduction of stresses and distortion that result from the combined heating profile of the induction heating profile generated by the one or more induction heating coil(s) 36 and the arc welding heating profile generated by the welding torch 16 may be affected by a determination of an optimum relationship of the positioning of the one or more induction heating coil(s) 36 and/or the welding torch 16 relative to the workpiece(s) 32 being worked on, and independent adjustment of the positioning positioning of the one or more induction heating coil(s) 36 and/or the welding torch 16 consistent with this determination. As described herein, control circuitry (e.g., the control circuitry 54, 62 of the welding power supply 12 and the induction power supply 38, respectively, or some other control circuitry of the system 10) may receive feedback from the sensors and/or sensor modules described herein, and may use this feedback to determine (e.g., estimate) the induction heating profile generated by the one or more induction heating coil(s) 36 and the arc welding heating profile generated by the welding torch 16, and may combine these determined heating profiles into a combined heating profile, determine an optimum positioning of the one or more induction heating coil(s) 36 and/or the welding torch 16 relative to the workpiece(s) 32 being worked on to minimize the distortion and/or stresses in the workpiece(s) 32, and then implement the determined optimum positioning by, for example, controlling the multiple robotic manipulators 88 or other mechanical motion systems to independently control the position, orientation, and/or movement of the one or more induction heating coil(s) 36 and/or the welding torch 16 relative to the workpiece(s) 32 in accordance with the determined optimum positioning such that the distortion and/or stresses in the workpiece(s) 32 are minimized. For example, in certain embodiments, the determined optimum positioning may lead to substantially no distortion and/or stresses (e.g., less than 5% distortion, less than 2% distortion, less than 1% distortion, less than 0.5% distortion, and so forth) in the workpiece(s) 32. In general, the embodiments described herein lead to welds where the workpiece(s) 32 show at least 60%, or even greater than 80%, reduction in distortion as compared to comparable welds.

Figure 18A:
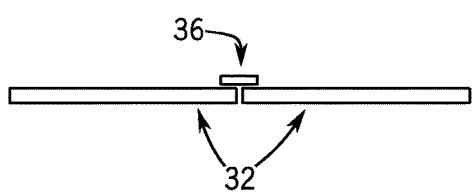
FIGS. 18A and 18B illustrates various induction heating coil configurations, in accordance with aspects of the present disclosure.
Figure 18B:
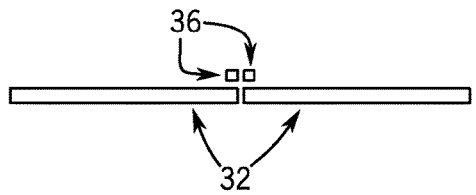

Similar heating patterns can be created in other types of weld joint such as lap joints. There are many different configurations of coil shape that can be applied to the process depending on the welding conditions. Example coil configurations for butt joints are shown in FIGS. 18A and 18B. Example coil configurations for T-fillet joints are shown in FIGS. 12A through 12H.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure. The presently disclosed methods may be used in systems using any metal fabrication processes, such as welding processes such as gas arc metal arc welding (GMAW or MIG), fluxed core arc welding (FCAW), fluxed core arc welding gas shielded (FCAW-G), metal core arc welding (MCAW), submerged arc welding (SAW), shielded metal arc welding (SMAW or STICK, or MMA or MMAW), plasma, laser, stud welding, flash butt welding, plasma welding, spot welding, seam welding, laser welding, gas tungsten arc welding (GTAW or TIG), friction stir welding (FSW), hybrid processes with two or more processes together, cutting processes including plasma, oxygen, hybrid cutting processes of two or more processes, forming processes, or similar process.

The invention claimed is:

1. A hybrid induction heating/welding assembly comprising:
    a metal working tool configured to perform a metal working process on at least one workpiece, wherein the metal working process generates a metal working heat profile in the at least one workpiece; and
    at least one induction heating coil configured to apply induction heat to the at least one workpiece, wherein the induction heat generates an induction heat profile in the at least one workpiece;
    wherein the metal working heat profile and the induction heat profile combine to generate a combined heat profile in the at least one workpiece, wherein the combined heat profile results in no distortion in the at least one workpiece from the metal working process; and
    control circuitry configured to:
        estimate the metal working heat profile and the induction heat profile in the at least one workpiece, to estimate the combined heat profile based on the estimated metal working heat profile and induction heat profile; and
        control a relative positioning of the metal working tool, the at least one induction heating coil, or both, to adjust the position of the metal working heat profile or the induction heat profile on the workpiece to minimize the distortion in the at least one workpiece.

2. The hybrid induction heating/welding assembly of claim 1, wherein the control circuitry is configured to control the relative positioning of the metal working tool, the at least one induction heating coil, or both, by transmitting control signals to at least one robotic manipulator.

3. The hybrid induction heating/welding assembly of claim 1, wherein the control circuitry is configured to estimate the metal working heat profile and the induction heat profile in the at least one workpiece based at least in part on feedback from one or more sensors or configuration parameters associated with the metal working process.

4. The hybrid induction heating/welding assembly of claim 3, wherein the one or more sensors comprise one or more position-detecting sensors configured to detect relative positions of the metal working tool or the at least one induction heating coil relative to the at least one workpiece, one or more temperature sensors configured to detect temperatures proximate the at least one workpiece, or a combination thereof.

5. The hybrid induction heating/welding assembly of claim 1, wherein the at least one workpiece comprises two workpieces that form a narrow gap.

6. The hybrid induction heating/welding assembly of claim 1, wherein the at least one workpiece comprises two workpieces that form a T-fillet joint together.

7. The hybrid induction heating/welding assembly of claim 1, wherein the at least one workpiece comprises two workpieces that form a butt joint together.

8. The hybrid induction heating/welding assembly of claim 1, wherein the metal working tool comprises a welding torch.

9. The hybrid induction heating/welding assembly of claim 1, wherein the metal working tool comprising a plasma cutting torch.

10. The hybrid induction heating/welding assembly of claim 1, wherein the at least one induction heating coil is a first induction heating coil positioned ahead of a welding torch, the assembly further comprising a second heating coil positioned behind the welding torch to provide a heat treatment of a weld location that has been fused, and a third induction heating coil to heat the workpiece ahead or behind of the metal working process to reduce the rate of cooling of the weld to prevent metallurgical damage.

11. A hybrid induction heating/welding assembly comprising:
    a protective outer housing configured to move relative to at least one workpiece;
    a metal working tool configured to perform a metal working process on the at least one workpiece, wherein the metal forming tool is at least partially enclosed within the protective outer housing, and wherein the metal working process generates a metal working heat profile in the at least one workpiece;
    at least one induction heating coil configured to apply induction heat to the at least one workpiece, wherein the at least one induction heating coil is at least partially enclosed within the protective outer housing and collocated with the metal working tool, and wherein the induction heat generates an induction heat profile in the at least one workpiece;
    wherein the metal working heat profile and the induction heat profile combine to generate a combined heat profile in the at least one workpiece, wherein the combined heat profile results in no distortion in the at least one workpiece from the metal working process; and
    control circuitry configured to:
        estimate the metal working heat profile and the induction heat profile in the at least one workpiece, to estimate the combined heat profile based on the estimated metal working heat profile and induction heat profile; and
        control a relative positioning of the metal working tool, the at least one induction heating coil, or both, to minimize the distortion in the at least one workpiece.

12. The hybrid induction heating/welding assembly of claim 11, wherein the control circuitry is configured to control the relative positioning of the metal working tool, the at least one induction heating coil, or the protective outer housing with respect to the workpiece by transmitting control signals to at least one robotic manipulator.

13. The hybrid induction heating/welding assembly of claim 11, wherein the control circuitry estimate the metal working heat profile and the induction heat profile in the at least one workpiece based at least in part on feedback from one or more sensors or configuration parameters associated with the metal working process.

14. The hybrid induction heating/welding assembly of claim 13, wherein the one or more sensors comprise one or more position-detecting sensors configured to detect relative positions of the metal working tool or the at least one induction heating coil relative to the at least one workpiece, one or more temperature sensors configured to detect temperatures proximate the at least one workpiece, or a combination thereof.

15. The hybrid induction heating/welding assembly of claim 11, wherein the at least one workpiece comprises two workpieces that form a narrow gap.

16. The hybrid induction heating/welding assembly of claim 11, wherein the at least one workpiece comprises two workpieces that form a T-fillet joint together.

17. The hybrid induction heating/welding assembly of claim 11, wherein the at least one workpiece comprises two workpieces that form a butt joint together.

18. The hybrid induction heating/welding assembly of claim 11, wherein the metal working tool comprises a welding torch.

19. The hybrid induction heating/welding assembly of claim 11, wherein the metal working tool comprising a plasma cutting torch.

* * * * *